US012756653B2

(12) United States Patent

Chachmon et al.

(10) Patent No.: US 12,756,653 B2

(45) Date of Patent: Oct. 6, 2026

(54) FABRIC ROUTING SYSTEMS AND METHODS THEREOF

(71) Applicant: Cisco Technology, Inc., San Jose, CA (US)

(72) Inventors: Nadav Chachmon, Moshav Yaad (IL); Ofer Iny, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 18/742,984

(22) Filed: Jun. 13, 2024

(65) Prior Publication Data

US 2025/0385859 A1 Dec. 18, 2025

(51) Int. Cl.
*H04L 45/03* (2022.01)

(52) U.S. Cl.
CPC .................................... *H04L 45/03* (2022.05)

(58) Field of Classification Search
CPC ....... H04L 45/48; H04L 45/033; H04L 45/42; H04L 45/50; H04L 45/12; H04L 45/22; H04L 45/04; H04L 45/02; H04L 45/28; H04L 45/03
See application file for complete search history.

(56) References Cited

U.S. PATENT DOCUMENTS 6,947,415 B1 * 9/2005 Nagaraj .................. H04L 45/02 370/413
7,243,160 B2 * 7/2007 Brahmaroutu .......... H04L 49/25 709/239
7,756,015 B1 * 7/2010 Bishara ................. H04L 45/583 370/218
2005/0122899 A1 * 6/2005 DeBoer ................... H04L 45/62 370/222
2006/0034302 A1 * 2/2006 Peterson ................. H04L 45/04 370/401
2008/0313450 A1 * 12/2008 Rosenberg ............ H04L 67/104 713/2
2009/0041037 A1 * 2/2009 Yang ....................... H04L 45/03 370/401
2009/0122724 A1 * 5/2009 Rosenberg .......... H04L 67/1065 370/255
(Continued)

*Primary Examiner* — Ninos Donabed
(74) *Attorney, Agent, or Firm* — Rutan & Tucker, LLP; Ravi Mohan; Marc A. McClain

(57) ABSTRACT

Devices, networks, systems, methods, and processes for routing data in a network are described herein. A network device may identify one or more fabric links and determine one or more system ports associated with the one or more fabric links. The network device can generate one or more Reverse Fabric Routing Tables (RFRTs) associated with the one or more system ports. The network device may detect changes in operational statuses of the one or more fabric links and update the RFRTs based on the detected changes. The network device can create and update a FRT based on the RFRTs. The network device may transmit one or more update messages to provide reachability, congestion, and bandwidth awarenesses to other network devices. The network device can be partitioned into one or more virtual elements to provide multiple reachability planes and may also dynamically adjust traffic routing for packet and/or flow spray traffic.

20 Claims, 10 Drawing Sheets

(56) References Cited

U.S. PATENT DOCUMENTS

| | | | | |
|---|---|---|---|---|
| 2009/0135824 | A1* | 5/2009 | Liu | H04L 45/32 370/432 |
| 2013/0188647 | A1* | 7/2013 | Herrell | H04L 45/02 370/392 |
| 2013/0308444 | A1* | 11/2013 | Sem-Jacobsen | H04L 47/125 370/242 |
| 2014/0314099 | A1* | 10/2014 | Dress | H04L 49/15 370/422 |
| 2016/0057801 | A1* | 2/2016 | Xia | H04W 72/30 370/221 |
| 2016/0072665 | A1* | 3/2016 | Xia | H04L 45/28 370/225 |
| 2016/0127236 | A1 | 5/2016 | Zahid et al. | |
| 2018/0139132 | A1 | 5/2018 | Edsall et al. | |
| 2018/0351850 | A1* | 12/2018 | Rahkala | H04L 45/74 |
| 2019/0095372 | A1* | 3/2019 | Huang | H04L 63/0272 |
| 2019/0166050 | A1 | 5/2019 | S et al. | |
| 2019/0280968 | A1* | 9/2019 | Sreenivasagaperumal | H04L 45/50 |
| 2020/0167369 | A1 | 5/2020 | Song et al. | |
| 2020/0389413 | A1* | 12/2020 | Lal | H04L 47/76 |
| 2022/0103661 | A1 | 3/2022 | Goel et al. | |
| 2023/0010247 | A1* | 1/2023 | Kumar | H04L 45/66 |
| 2023/0388142 | A1* | 11/2023 | Pai | H04L 12/185 |

* cited by examiner

FABRIC ROUTING SYSTEMS AND METHODS THEREOF

The present disclosure relates to network communication. More particularly, the present disclosure relates to fabric routing in a communication network.

BACKGROUND

Many Artificial Intelligence (AI)/Machine Learning (ML) networks utilize multistage switching networks, such as Clos networks. AI/ML training typically requires a long time, ranging from hours to days, spanning over multiple training cycles. The training cycles generally utilize multiple Graphics Processing Units (GPUs) for different training functions. A GPU in the network can exchange data through one or more collective operations to other GPUs in the network.

If the network faces link failures, several issues arise in the AI/ML training. Primarily, the link failures compromise symmetry of a topology of the network. Updating a routing function takes a certain amount of time, and hence, the link failures also lead to packet loss resulting in significant delays, often in tens of milliseconds. Many AI/ML trainings utilize ranking as a type of supervised ML that utilizes labeled datasets to train data and models to classify future data to predict outcomes. In that case, completion of the AI/ML training is contingent upon receiving results from a last participating rank by other ranks in the network. Consequently, the AI/ML training is heavily influenced by a tail latency of slowest rank to communicate the results. The tail latency may be compromised until the routing function updates.

Moreover, a control plane in the AI/ML networks generally focuses on reachability, and hence, lacks awareness of bandwidth and congestion. Existing routing methods fail to address concerns of reachability and congestion, and cannot be scaled to address these concerns. Additionally, a mixture of dynamic load balanced traffic, such as congestion aware or oblivious packet spray traffic and flow spray traffic, such as Equal-Cost Multi-Path (ECMP) routing poses another challenge. In this case, congestion information generated by flow spray traffic is not communicated to leaf nodes in the network, and hence, is not factored into packet spray traffic management or other dynamic load balancing methods such as flow-let traffic, dynamic flow spray traffic, etc. Such traffic management lies outside a purview of existing routing protocols.

Therefore, there is a need for a routing technique that can provide reachability, congestion, and bandwidth awareness to the leaf nodes in the network, and that can reduce the packet loss and minimize the latency of the network.

SUMMARY OF THE DISCLOSURE

Systems and methods for routing data in a network fabric in accordance with embodiments of the disclosure are described herein. In some embodiments, a device includes a processor, and a memory communicatively coupled to the processor, wherein the memory includes a fabric routing logic that is configured to detect a plurality of network devices, identify a plurality of fabric links associated with the plurality of network devices, determine one or more system ports associated with one or more fabric links of the plurality of fabric links, and generate, for each system port of the one or more system ports, a Reverse Fabric Routing Table (RFRT), wherein the RFRT is associated with the one or more fabric links.

In some embodiments, generating the RFRT includes determining one or more operational statuses of the one or more fabric links.

In some embodiments, the RFRT includes one or more port link entries indicative of the one or more operational statuses of the one or more fabric links.

In some embodiments, the fabric routing logic is further configured to generate a Fabric Routing Table (FRT) based on one or more RFRTs associated with the one or more system ports.

In some embodiments, the FRT includes a plurality of device link entries associated with the plurality of fabric links.

In some embodiments, the plurality of device link entries are indicative of a plurality of operational statuses of the plurality of fabric links.

In some embodiments, determining the one or more operational statuses of the one or more fabric links includes detecting a change in an operational status of a first fabric link of the plurality of fabric links.

In some embodiments, the fabric routing logic is further configured to generate a first update message indicative of the change in the operational status of the first fabric link, and transmit the first update message to the plurality of network devices.

In some embodiments, determining the one or more operational statuses of the one or more fabric links includes receiving a second update message indicative of a change in the operational status of a second fabric link.

In some embodiments, the fabric routing logic is further configured to identify the one or more port link entries associated with the first fabric link and the second fabric link, and modify the one or more port link entries to indicate the change in the operational status of the first fabric link and the second fabric link.

In some embodiments, the fabric routing logic is further configured to identify one or more device link entries associated with the one or more port link entries, and modify the one or more device link entries based on modification to the one or more port link entries.

In some embodiments, the one or more device link entries include one or more timestamps indicative of one or more times of modification of the one or more device link entries.

In some embodiments, the fabric routing logic is further configured to transmit the FRT to the plurality of network devices.

In some embodiments, a fabric routing logic is configured to detect a plurality of network devices, identify a plurality of fabric links associated with the plurality of network devices, determine a plurality of operational statuses of the plurality of fabric links, and generate a fabric routing table including a plurality of link entries associated with the plurality of fabric links, wherein the plurality of link entries are indicative of the plurality of operational statuses.

In some embodiments, the fabric routing logic is further configured to detect a change in an operational status of a fabric link of the plurality of fabric links.

In some embodiments, the fabric routing logic is further configured to generate an update message indicative of the change in the operational status of the fabric link, and transmit the update message to the plurality of network devices.

In some embodiments, the fabric routing logic is further configured to identify a link entry of the plurality of link entries associated with the fabric link, and modify the link entry to indicate the change in the operational status of the fabric link.

In some embodiments, a method includes detecting a plurality of network devices, identifying a plurality of fabric links associated with the plurality of network devices, determining a plurality of operational statuses of the plurality of fabric links, and generating a fabric routing table including a plurality of link entries associated with the plurality of fabric links, wherein the plurality of link entries are indicative of the plurality of operational statuses.

In some embodiments, the method further includes detecting a change in an operational status of a fabric link of the plurality of fabric links.

In some embodiments, the method further includes identifying a link entry of the plurality of link entries associated with the fabric link, and modifying the link entry for indicating the change in the operational status of the fabric link.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
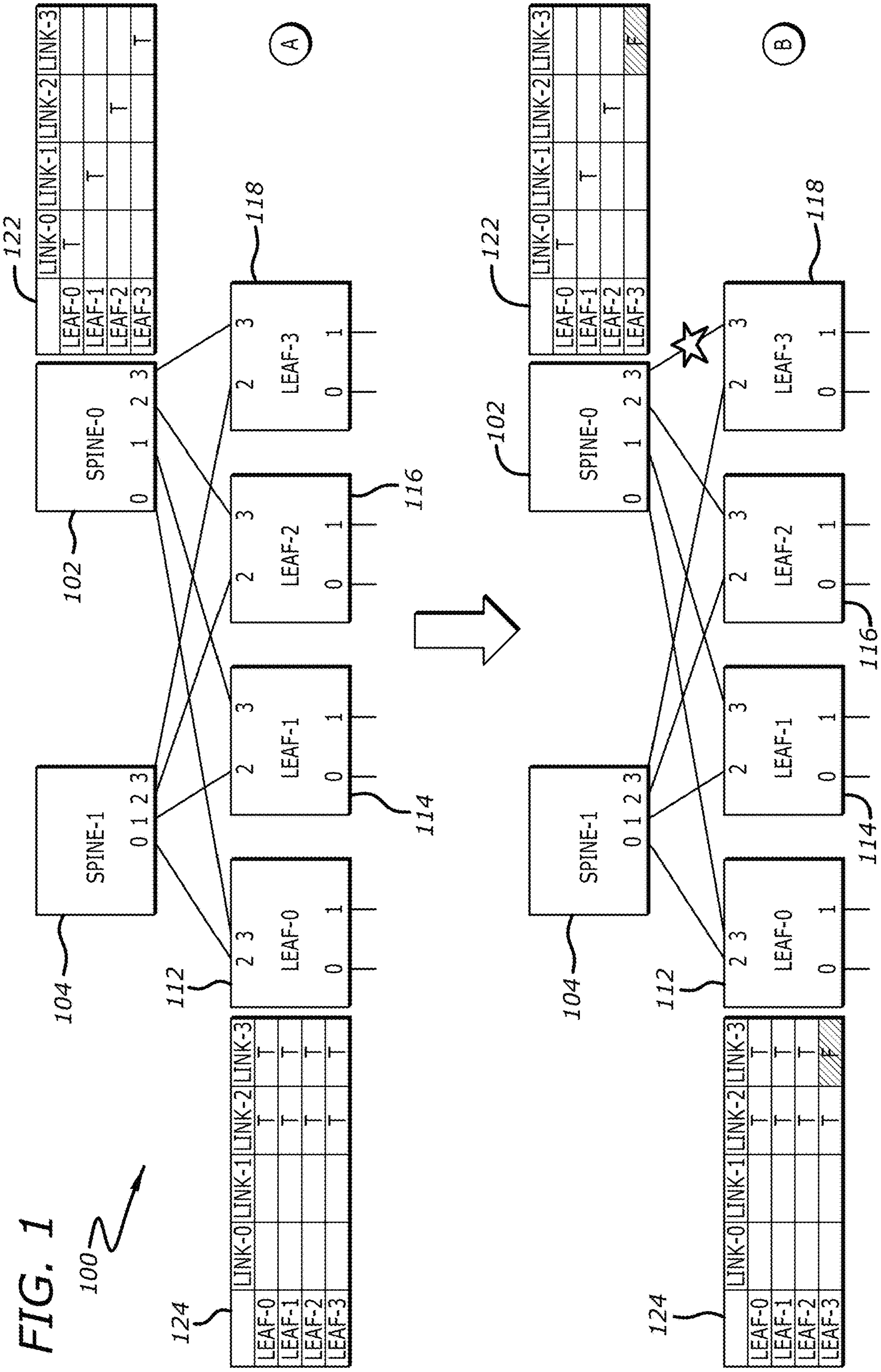
FIG. 1 is a conceptual illustration of a network illustrating a Fabric Routing Table (FRT), in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods for routing data in a network fabric in accordance with embodiments of the disclosure are described herein. In many embodiments, a network can include a plurality of network devices such as but not limited to spine switches or leaf switches, for example. A plurality of spine and leaf switches can be connected in a leaf-spine topology, i.e., a leaf-spine fabric. The leaf switches may include Top-Of-Rack (TOR) switches or End of Row (EOR) switches etc., for example. Multiple TOR switches and one or more spine switches can be connected in a mesh topology. The TOR switches may be deployed at an edge of a network, near servers, storage arrays, and other network devices such as but not limited to application servers or virtual machines etc. for example. The TOR switches can be connected to the host devices directly or indirectly. The TOR switches may also facilitate Virtual Local Area Network (VLAN) tagging, routing protocols, access control lists, or Quality of Service (QoS) etc., for example. In some embodiments, the leaf-spine fabric may be a Disaggregated Scheduled Fabric (DSF).

In a number of embodiments, the network may utilize a Fabric Routing Table (FRT) to provide reachability awareness. The FRT can be generated, modified, and/or stored by the spine switches and/or the leaf switches in the network. The FRT may be shared among the spine switches and the leaf switches in the network. The FRT can be utilized for routing data, such as packet spray traffic and/or flow spray traffic, in the leaf-spine fabric through the spine switches and the leaf switches. In some embodiments, for instance, in case of fabric link failures or when a failed fabric link is restored, the FRT can be updated and shared, thereby providing reachability update to the spine switches and the leaf switches in the network. The network can also utilize Fabric Routing Protocol (FRP) messages to communicate reachability among the network devices. In certain embodiments, for instance, in case of failure of a fabric link at a spine switch, the spine switch may generate and transmit one or more FRP messages to other network devices, thereby communicating the unreachability of the fabric link. The other network devices may receive the FRP messages and update corresponding FRTs. The other network devices, hence, can adjust routing of the packet spray traffic and/or the flow spray traffic based on the updated FRTs. By dynamically updating the FRTs in response to the fabric link failures and fabric link restorations, the network can optimize traffic routing, thereby ensuring efficient delivery of data while circumventing the failed fabric links. This proactive approach to traffic management may enhance reliability and minimize disruptions caused by the fabric link failures.

In various embodiments, the network device such as the spine switch and/or the leaf switch can detect a plurality of network devices, i.e., other switches in the network. In some embodiments, for example, the network device can utilize one or more network discovery protocols such as but not limited to Link Layer Discovery Protocol (LLDP) or Cisco Discovery Protocol (CDP) etc. for detecting the other switches. In certain embodiments, for example, the network device can detect adjacent network devices as well as remote network devices in the network. In more embodiments, for example, the adjacent network devices may be the network devices directly connected to the network device and the remote network devices can be the network devices connected by way of one or more intermediate network devices. The network device can thereafter identify a plurality of fabric links associated with the plurality of network devices. In more embodiments, for example, the fabric links may be physical and/or logical connections utilized to communicate with the other network devices.

In some more embodiments, for example, a fabric link between a leaf switch and a spine switch in the network may be a physical connection and a fabric link between two leaf switches can be a logical connection. After identifying the fabric links, the network device may determine one or more system ports associated with the fabric links. In numerous embodiments, for example, a system port of a leaf switch can be connected to one or more spine switches through one or more physical connections and the system port may be connected to the one or more other leaf switches through one or more logical connections. The network device can generate a Reverse Fabric Routing Table (RFRT) for each system port. The RFRT can comprise one or more port link entries associated with one or more fabric links connected through the system port. In many more embodiments, for example, the RFRT can comprise information related to reachable routes, i.e., the fabric links, and reachable destinations, i.e., the network devices that can be communicated with through the fabric links. In further embodiments, for example, when a source network device transmits data to a destination network device through an egress port, an RFRT associated with the egress port may be utilized for identifying routes through which the data can be routed to the destination network device.

In additional embodiments, the network device may determine operational statuses of the fabric links. In that, in some embodiments, for example, an operational status of a fabric link can indicate whether the fabric link is functional or non-functional. The network device can also determine changes in the operational statuses of the fabric links. In that, in certain embodiments, for example, a change in the operational status of the fabric link may indicate failure of the fabric link or restoration of a failed fabric link. In more embodiments, for example, if the fabric link is operational, a corresponding port link entry in the RFRT can indicate that the fabric link is "up" or "active", and conversely, if the fabric link is non-operational, the corresponding port link entry in the RFRT may indicate that the fabric link is "down" or "inactive". In numerous embodiments, for example, the RFRT of the system port can comprise a bitmap indicative of the operational statuses of the one or more fabric links associated with the system port. In many more embodiments, in operation, generating the RFRT can comprise generating a Live Link Status Vector (LLSV). In some embodiments, the LLSV can be a dynamic data structure for storing the operational statuses of the fabric links. In certain embodiments, for example, cach entry, i.e., each bit in the LLSV can be indicative of an operational status of a fabric link connected to the network device. The network device can dynamically update the LLSV, thereby dynamically updating the RFRT. In more embodiments, for example, upon receiving an interrupt from an Interface Group (IFG) associated with failure of a fabric link, the network device can update a corresponding bit in the LLSV to indicate failure of the fabric link. Similarly, when a control plane detects that the failed fabric link is restored, the network device can update the corresponding bit in the LLSV to indicate restoration of the fabric link. The network device can utilize the LLSV to generate the RFRT.

In further embodiments, the operational status of the fabric link may be indicative of a congestion in the fabric link. In that, cach system port may be associated with one or more queues, such as multiple output queues, for example. The output queues may store different types of data scheduled for transmission over the fabric link. The data may be associated with different traffic classes and the output queues may have different sizes. The output queues can be served, i.e., the data from the output queues may be transmitted over the fabric link based on one or more scheduling policies of the network device. Examples of the scheduling policies include but are not limited to strict priority scheduling, weighted fair queuing, or round-robin scheduling etc. In numerous embodiments, for example, the output queues associated with one or more types of data may be prioritized over other output queues. That is, the data in prioritized output queues may be transmitted with a higher priority. In some embodiments, such scheduling policies and/or prioritization may cause a buildup in the output queues. In certain embodiments, for example, the buildup in an output queue may be caused due to an oversubscription toward the system port associated with the output queue, that is, an incoming traffic rate at the system port may exceed a port rate associated with the system port. In such cases, the operational status of the corresponding fabric link may be indicative of the buildup in the output queue. In more embodiments, for example, a first output queue associated with a higher priority may receive data at a higher rate than a second output queue associated with a lower priority, thereby causing a delay in serving the second output queue. In this case, the operational status associated with the fabric link may be indicative of the congestion caused due to the delay in serving the second output queue. In still more embodiments, the operational status may be indicative of a utilization of the fabric link. In that, the utilization of the fabric link can be indicative of a percentage of used capacity of the fabric link. In many further embodiments, when the percentage exceeds a threshold percentage value, the operational status associated with the fabric link may be changed and/or updated to indicate that the fabric link is congested. In many embodiments, the threshold percentage value may be configurable and/or may differ for different fabric links, for example.

In many additional embodiments, the network device can generate a Fabric Routing Table (FRT) based on one or more RFRTs of the one or more system ports of the network device. In some embodiments, the FRT may comprise a plurality of device link entries associated with the plurality of fabric links connected to the network device. Each device link entry can indicate the operational status of the corresponding fabric link. In certain embodiments, for example, the device link entries may also indicate utilization parameters of the fabric link, such as but not limited to bandwidth utilization, latency, congestion, link health, or link performance, etc. for example. The device link entries may also comprise a timestamp indicative of a time of latest operational status of the fabric link. In numerous embodiments, for example, the timestamp can be indicative of a time of detecting the change in the operational status of the fabric link. In some embodiments, for example, the timestamp may be indicative of a time of receiving an update message indicative of the change in the operational status of the fabric link. In certain embodiments, for example, the timestamp can be indicative of a time of change in the operational status of the fabric link. In more embodiments, for example, the network device can continually monitor the operational statuses of the fabric links to accordingly update one or more of: the LLSV, the RFRT, or the FRT. In some more embodiments, the network device can update one or more of: the LLSV, the RFRT, or the FRT upon receiving an interrupt from IFG or an FRP update message. In numerous embodiments, the network device can transmit the FRT to other network devices in the network. In many more embodiments, for example, the FRT can be shared among one or more network devices through a distributed storage database. In still more embodiments, for example, each network device can store and update a separate FRT that can indicate a reachability status of the corresponding network device.

In many further embodiments, the network device can comprise and/or implement a Fabric Routing Manager (FRM) to dynamically store, update, and/or share one or more of: the LLSV, the RFRT, or the FRT. In some embodiments, for example, the FRM may be a software implemented by a processor in the network device, or a controller configured to manage routing of the data. In certain embodiments, for example, the FRM can dynamically route the data, including the packet spray traffic and the flow spray traffic based on one or more of: the LLSV, the RFRT, or the FRT. The FRM can generate and transmit one or more update messages to the other network devices upon detecting change in the operational status of the fabric link. The FRM may also receive one or more update messages from the other network devices, indicative of a change in the operational status of the fabric link. The FRM can update one or more of: the LLSV, the RFRT, or the FRT based on the received update message. In more embodiments, for example, the update messages can be FRP messages. In many more embodiments, the network device can transmit the update messages dynamically upon detecting the change in the operational status of the fabric link. In many further embodiments, the network device may transmit the update messages periodically to the other network devices in the network. In still further embodiments, the update messages may be sent to upstream network devices in the network.

In still many embodiments, the network device may comprise one or more Virtual Forwarding Elements (VFEs). In some embodiments, for example, the VFEs in the network device can independently route data through different fabric links, thereby functioning as a virtual switch. In certain embodiments, for example, a network device can configure a first VFE for a first set of system ports and a second VFE for a second set of system ports. In more embodiments, for example, the VFEs can facilitate multiple reachability planes for connections with the other network devices in the network. In some more embodiments, the network device can facilitate configuration of a number of VFEs, or the number of VFEs can be configured, changed or modified by an operator of the network. In many more embodiments, for example, the network device can generate a separate FRT for each VFE. In some more embodiments, for example, one or more VFEs can share one or more FRTs.

In still further embodiments, one or more system ports may be ingress ports, egress ports, and/or both: ingress-egress/bidirectional ports. The network device can configure each system port with one or more port attributes. In some embodiments, for example, a first port attribute can be indicative of a VFE associated with the system port, for example, a VFE identifier or a VFE number (VFE#). In some more embodiments, for example, the VFE# can be indicative of a virtual switch associated with the system port. In numerous embodiments, for example, a second port attribute may be indicative of whether the system port is an ingress port or an egress port. In many more embodiments, for example, a third port attribute can be indicative of a system port identifier, such as but not limited to a port number (Port#). In still further embodiments, cach network device can be associated with a device index, for example, the leaf switches in the network may be indexed Leaf-0 through Leaf-n and the spine switches in the network can be indexed Spine-0 through Spine-n. In still more embodiments, for example, tunneled dual-home endpoint devices with same tunnel pointer can be indexed as separate devices. In further embodiments, the network device can be configured with a topology learning timer. In some embodiments, for example, the network device can refresh a topology, i.e., detect and/or update the topology of the network periodically after expiration of the topology learning timer. The topology learning timer can be reset after expiration, to ensure periodic updating of the topology by the network device. In more embodiments, each network device can comprise the topology learning timer of same or different durations.

In numerous embodiments, the FRP messages received from one or more downstream devices can be stored in the RFRT of the network device. In some embodiments, the FRM can generate and transmit the FRP messages to one or more upstream devices. In some more embodiments, for example, a VFE can generate and transmit FRP messages associated with a group of ports associated with the VFE. In certain embodiments, for example, the VFE can include VFE# and/or Port# in the FRP messages. In more embodiments, for example, the FRP messages generated by Egress Line Card (ELC) and/or Ingress Line Card (ILC) may comprise corresponding ELC identifier (ELC#) and/or ILC identifier (ILC#) respectively. In certain embodiments, for example, the VFE can generate FRP messages comprising bitwise indications of the operational statuses of the fabric links. In more embodiments, for example, both: RFRT and FRT can comprise corresponding timestamps associated with the time indicative of the updating the operational statuses of the fabric links. In some more embodiments, for example, both: RFRT and FRT can include one or more of Port#, VFE#, or LC# etc. In many more embodiments, for example, the FRT may be a transpose of the RFRTs of the network device. In still many embodiments, for example, the FRP update messages can also be utilized to update one or more Network Processing Unit (NPU) tables or load balancing tables utilized for routing and/or management of the traffic in the network.

In many embodiments, in addition to providing reachability awareness, the FRT can also be utilized to provide bandwidth awareness. In that, the FRT can also indicate bandwidth reduction information in case of fabric link failures. In some embodiments, in an example, a destination leaf switch can be connected to the spine switch by way of four fabric links. If three of the four fabric links fail, the bandwidth available to transmit data to the destination leaf switch may be reduced by 75%. Here, the reduction in the bandwidth may be indicated by updating the FRT and sharing the updated FRT with other leaf switches and spine switches in the network. For that, the FRT may comprise additional parameters indicative of the bandwidth associated with each connection of the network device. In that, to facilitate determination of changes in the bandwidth, including reduction as well as restoration of the bandwidth, the network device can configure one or more reachability planes. Each fabric link can be associated with a reachability plane. The network device may determine reachability information for each reachability plane. The reachability information can indicate reachability as well as available bandwidth associated with the reachability plane. In more embodiments, continuing the example, for a source leaf switch connected to the same spine switch through four local fabric links, the reachability plane can be associated with all fabric links connecting to the destination leaf switch, including: physical and logical connections between the source leaf switch and the destination leaf switch. That is, the reachability plane may be associated with the physical connections, i.e., the local fabric links between the source leaf switch and the spine switch as well as remote fabric links, i.e., the fabric links between the spine switch and the destination leaf switch. Here, the updated FRT received by the source leaf switch may indicate that the bandwidth associated with the reachability plane is reduced to 25%. Therefore, although the four local fabric links between the source leaf switch and the spine switch may appear to be operational to the source leaf switch, the source leaf switch can appropriately route the data based on the information of the reduction in the bandwidth caused by the failure of the remote fabric links between the spine switch and the destination leaf switch.

In a number of embodiments, the network device may utilize VFEs to create and maintain distinct reachability planes. In some embodiments, continuing the example, the spine switch may comprise one or more VFEs, such as but not limited to a first VFE and a second VFE, thereby providing two reachability planes between the source leaf switch and the destination leaf switch. It may be understood that the spine switch may comprise any number of VFEs, and hence, may provide many reachability planes between the source leaf switch and the destination leaf switch. In certain embodiments, for example, the bandwidth reduction can be caused by the fabric link failures associated with the first VFE in the spine switch whereas the bandwidth associated with the second VFE within the spine switch can be unaffected. Therefore, a first reachability plane associated with the first VFE can face the bandwidth reduction whereas a second reachability plane associated with the second VFE may be unaffected. As a result, a first FRT associated with the first reachability plane may be updated to indicate the bandwidth reduction and a second FRT associated with the second reachability plane may be unchanged. Thus, the VFEs and corresponding FRTs may facilitate isolation of the reachability information associated with the separate reachability planes.

In various embodiments, in addition to providing reachability awareness and bandwidth awareness, the FRT can also be utilized to provide congestion awareness. Typically, the network may route different types of traffic, including the packet spray traffic and the flow spray traffic. The network may also route ECMP traffic in some examples. Therefore, the network can utilize dynamic load balancing considering the different types of traffic. Initially, a proportion of the packet spray traffic and the flow spray traffic is unknown. Further, the packet spray traffic may require packet-level load balancing as individual data packets in a flow may be sprayed over the fabric links in the network, followed by packet reorganization at destination. Similarly, the flow spray traffic can require flow-level load balancing as different flows may comprise different amounts of data. In some embodiments, for example, routing the flow spray may take into consideration a previous route utilized by a previous instance of the flow, whereas in some more examples, every instance of the flow may utilize same or different routes irrespective of the previous route. Therefore, in case of large flows, the route utilized for the large flows may experience congestion. If this congestion occurs remotely, i.e., between the spine switch and a first leaf switch due to the flow transmitted by a second leaf switch, a third leaf switch that intends to transmit the data to the first leaf switch may be unaware of the congestion. Therefore, the network may utilize a Congestion-Aware FRT (CAFRT) to provide the congestion awareness to the third leaf switch.

In additional embodiments, the network device can generate, store, and maintain the CAFRT. To generate the CAFRT, the network device may utilize telemetry data received from other network devices. In some embodiments, for example, the telemetry data can be indicative of one or more of: amount of traffic, type of traffic, the fabric link associated with the traffic, or the reachability plane associated with the traffic etc. In certain embodiments, for example, the network device may also augment one or more of: the LLSV, RFRT, or FRT to indicate the congestion. In more embodiments, for example, the network device can update the CAFRT upon detecting the congestion and transmit the updated CAFRT to the other network devices in the network. In some more embodiments, for example, the network device can generate and transmit FRP messages indicative of the detected congestion. In numerous embodiments, for example, the FRP messages may be augmented to indicate whether the reachability of the fabric link is affected by congestion or by failure. In further embodiments, for example, the FRP messages associated with the indication of congestion can be transmitted periodically, thereby facilitating periodic congestion updates to the other network devices in the network. In numerous embodiments, in operation, for example, if a high bandwidth flow spray traffic from the first leaf switch to the second leaf switch consumes 100% of the bandwidth of the fabric links associated with the spine switch, the traffic from other leaf switches to the first leaf switch and/or the second leaf switch may be temporarily rerouted through a different spine switch to avoid exacerbating the congestion, at least until the high bandwidth flow spray traffic terminates.

Advantageously, the FRT, RFRT, and CAFRT may provide a comprehensive view of the topology of the network, including both: the adjacent network devices and the remote network devices. The FRT, RFRT, and CAFRT can also provide a comprehensive view of the connectivity in the network, including both: physical connections and logical connections, comprising both: local fabric links and remote fabric links. The FRT and the RFRT can be updated periodically by utilizing a timer and/or can be updated dynamically upon detecting changes in the topology or the operational statuses of the fabric links. The FRP update messages may facilitate sharing updates with the other network devices. The FRP messages can also be augmented to share the congestion information or any other information about the state of the network. The VFEs may provide the reachability planes to indicate bandwidth reduction caused due to the fabric link failures, thereby facilitating optimal routing of the traffic in the network. Further, any number of network devices may be configured with the FRM, thereby facilitating easy scaling of the network and the routing system therein. Furthermore, the network can mitigate congestions caused by the high bandwidth flow traffic by utilizing the CAFRT. Hence, the network can effectively dynamically balance the routing of the traffic even in scenarios involving mixed traffic types, remote congestion, remote fabric link failures, or remote bandwidth reductions, thereby allowing for efficient bandwidth utilization and optimized network performance.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network 100 illustrating a Fabric Routing Table (FRT), in accordance with various embodiments of the disclosure is shown. In many embodiments, the network 100 may comprise a plurality of spine switches including but not limited to a first spine switch 102 and a second spine switch 104. The plurality of spine switches may be connected to a plurality of leaf switches including but not limited to a first leaf switch 112, a second leaf switch 114, a third leaf switch 116, and a fourth leaf switch 118. Each leaf switch of the plurality of leaf switches may include a plurality of system ports. The system ports can be ingress ports or egress ports. In some embodiments, for example, each of the plurality of leaf switches may include at least two ingress ports within an Ingress Line Card (ILC) and at least two egress ports within an Egress Line Card (ELC). Further, each spine switch of the plurality of spine switches may be associated with a spine switch index. In certain embodiments, for example, the first spine switch 102 can be associated with a first spine switch index (Spine-0) and the second spine switch 104 can be associated with a second spine switch index (Spine-1). Similarly, cach leaf switch of the plurality of leaf switches may be associated with a leaf switch index. In more embodiments, for example, the first leaf switch 112 can be associated with a first leaf switch index (Leaf-0), the second leaf switch 114 can be associated with a second leaf switch index (Leaf-1), the third leaf switch 116 can be associated with a third leaf switch index (Leaf-2), and the fourth leaf switch 118 can be associated with a fourth leaf switch index (Leaf-3). Furthermore, cach system port of the plurality of leaf switches and the plurality of spine switches may be associated with a port number. In some more embodiments, for example, the ingress ports of each of the plurality of leaf switches may be numbered Port-0 and Port-1 whereas the egress ports of each of the plurality of leaf switches can be numbered Port-2 and Port 3. Similarly, fabric facing ports of cach of the plurality of spine switches may be numbered Port-0, Port-1, Port-2, and Port-3, for example. In numerous embodiments, the plurality of spine switches and the plurality of leaf switches may be connected in a mesh topology, thereby forming a leaf-spine fabric. In many more embodiments, for example, the leaf-spine fabric can be a Disaggregated Scheduled Fabric (DSF). In still further embodiments, for example, the leaf-spine fabric can support routing of different types of traffic, including but not limited to packet spray traffic, flow spray traffic, or Equal-Cost Multi-Path (ECMP) traffic etc.

In a number of embodiments, as shown in A in FIG. 1., the first spine switch 102 may generate and store a first FRT 122 and the first leaf switch 112 may generate and store a second FRT 124. For generating the first FRT 122, the first spine switch 102 can detect the first leaf switch 112, the second leaf switch 114, the third leaf switch 116, and the fourth leaf switch 118. The first spine switch 102 may identify a plurality of fabric links connecting to the first leaf switch 112, the second leaf switch 114, the third leaf switch 116, and the fourth leaf switch 118. In some embodiments, for example, the plurality of fabric links can include a first fabric link (Link-0) between Port-0 and the first leaf switch 112, a second fabric link (Link-1) between Port-1 and the second leaf switch 114, a third fabric link (Link-2) between Port-2 and the third leaf switch 116, and a fourth fabric link (Link-3) between Port-3 and the fourth leaf switch 118. The first FRT 122 can comprise the leaf switch indexes, viz. Leaf-0, Leaf-1, Leaf-2, and Leaf-3, and corresponding fabric link numbers, viz. Link-0, Link-1, Link-2, and Link-3. The first spine switch 102 can determine operational statuses of the fabric links and store an indication of the operational statuses in the first FRT 122. In certain embodiments, for example, the first FRT 122 may include a bitmap indicative of the operational statuses of the fabric links, viz. Link-0, Link-1, Link-2, and Link-3.

In various embodiments, for generating the second FRT 124, the first leaf switch 112 can detect the second leaf switch 114, the third leaf switch 116, and the fourth leaf switch 118. The first leaf switch 112 may identify a plurality of fabric links connecting to the second leaf switch 114, the third leaf switch 116, and the fourth leaf switch 118. In some embodiments, for example, the plurality of fabric links can include a first fabric link (Link-0) connected to Port-0, a second fabric link (Link-1) connected to Port-1, a third fabric link (Link-2) connected to Port-2, and a fourth fabric link (Link-3) connected to Port-3. The first leaf switch 112 can detect that the third fabric link (Link-2) and the fourth fabric link (Link-3) are connected to each of the second leaf switch 114, the third leaf switch 116, and the fourth leaf switch 118 through the first spine switch 102 and the second spine switch 104 respectively. The second FRT 124 can comprise the leaf switch indexes, viz. Leaf-0, Leaf-1, Leaf-2, and Leaf-3, and corresponding fabric link numbers, viz. Link-0, Link-1, Link-2, and Link-3. The first leaf switch 112 can determine operational statuses of the fabric links and store an indication of the operational statuses in the second FRT 124. In certain embodiments, for example, the second FRT 124 may include a bitmap indicative of the operational statuses of the fabric links, viz. Link-0, Link-1, Link-2, and Link-3.

In additional embodiments, as shown in B in FIG. 1., the first spine switch 102 can detect a failure of the fourth fabric link (Link-3) connected between the Port-3 and the fourth leaf switch 118. The first spine switch 102 may update the first FRT 122 to indicate the failure of the fourth fabric link (Link-3). The first spine switch 102 may generate and transmit an update message, such as but not limited to a Fabric Routing Protocol (FRP) message to the first leaf switch 112, the second leaf switch 114, and the third leaf switch 116. In some embodiments, for example, the first spine switch 102 can also share the updated first FRT 122 with the first leaf switch 112, the second leaf switch 114, and the third leaf switch 116. The first leaf switch 112 may receive the FRP message and identify a fabric link, i.e., Link-3 in the second FRT 124 associated with the FRP message. Thereafter, the first leaf switch 112 can update the second FRT 124 to indicate the failure of the Link-3 connected to the fourth leaf switch 118 through the first spine switch 102.

Although a specific embodiment for the network 100 for carrying out the various steps, processes, methods, and operations described herein is discussed with respect to FIG. 1, any of a variety of systems and/or processes may be utilized in accordance with embodiments of the disclosure. For example, the first spine switch 102 can continually monitor the operational statuses of the fabric links and dynamically generate and transmit the FRP messages. The elements depicted in FIG. 1 may also be interchangeable with other elements of FIGS. 2-10 as required to realize a particularly desired embodiment.

Figure 2:
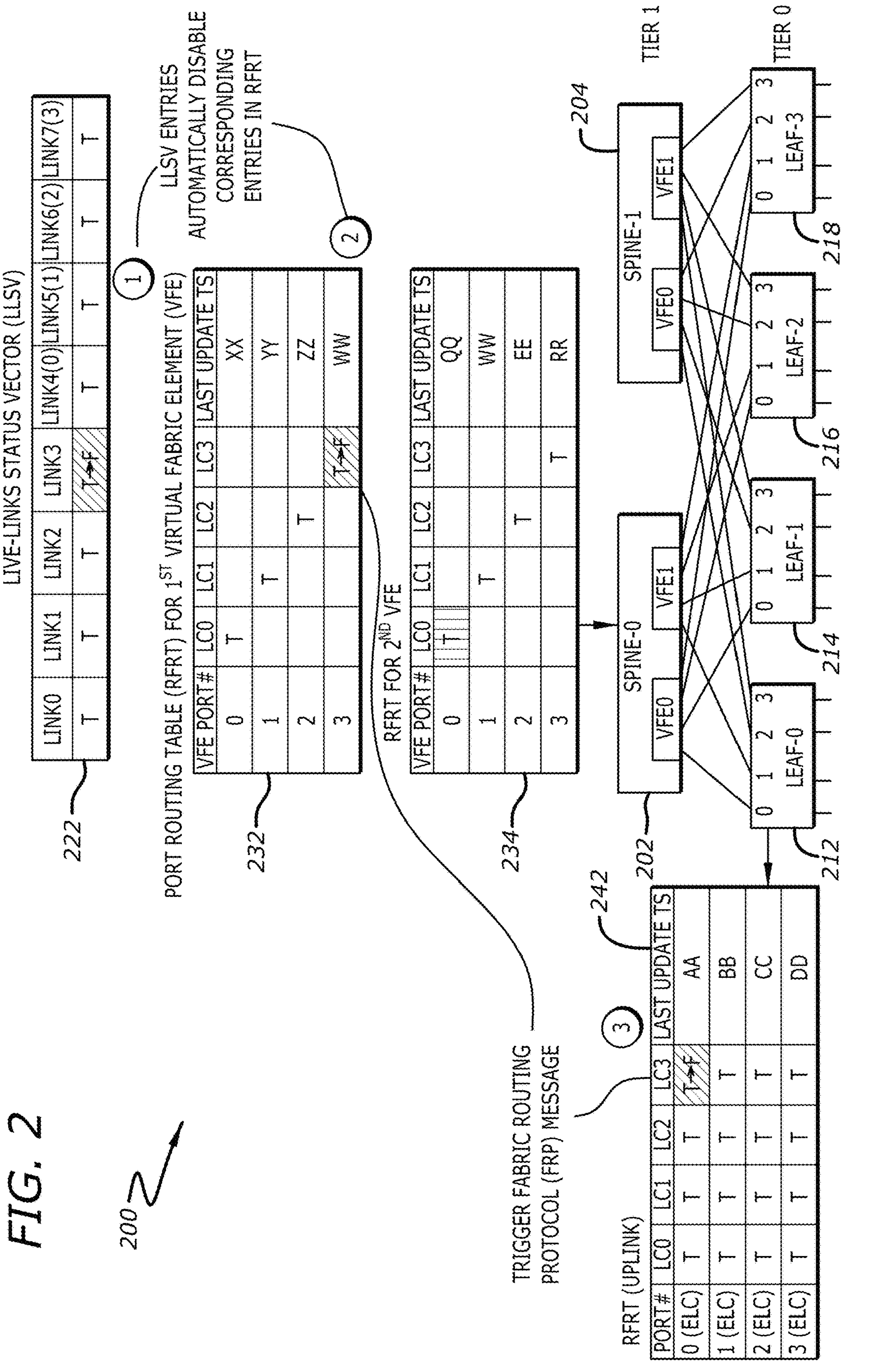
FIG. 2 is a conceptual illustration of a network for updating a plurality of Reverse Fabric Routing Tables (RFRTs), in accordance with various embodiments of the disclosure.

Referring to FIG. 2, a conceptual illustration of a network 200 illustrating updating a plurality of Reverse Fabric Routing Tables (RFRTs), in accordance with various embodiments of the disclosure is shown. In many embodiments, the network 200 may comprise a plurality of spine switches including but not limited to a first spine switch 202 and a second spine switch 204. The plurality of spine switches may be connected to a plurality of leaf switches including but not limited to a first leaf switch 212, a second leaf switch 214, a third leaf switch 216, and a fourth leaf switch 218. The first spine switch 202 may comprise a first Virtual Fabric Element (VFE) (VFE-0) and a second VFE (VFE-1). Similarly, the second spine switch 204 may comprise a first VFE (VFE-0) and a second VFE (VFE-1). Each of the first and second VFEs may comprise four system ports, for example.

In a number of embodiments, as shown in Step 1 of FIG. 2, the first spine switch 202 can generate a Live Link Status Vector (LLSV) 222 associated with the system ports of the first spine switch 202. In some embodiments, the LLSV 222 can be a dynamic data structure for storing the operational statuses of the fabric links associated with the system ports of the first spine switch 202. Each bit in the LLSV 222 can be indicative of an operational status of a fabric link connected to the first spine switch 202. The first spine switch 202 can dynamically update the LLSV 222 upon detecting a change in an operational status of a fabric link, in this case, a fabric link connected to the first VFE (VFE-0). The first spine switch 202 may generate and store a first RFRT 232 associated with the first VFE (VFE-0) and a second RFRT 234 associated with the second VFE (VFE-1).

In various embodiments, as shown in Step 2 of FIG. 2, the first RFRT 232 and the second RFRT 234 may dynamically update upon updating the LLSV 222. The first RFRT 232 and the second RFRT 234 can store the operational statuses of the fabric links connected to the first VFE (VFE-0) and the second VFE (VFE-1) respectively. In some embodiments, for example, upon receiving an interrupt from an Interface Group (IFG) associated with failure of a fabric link, the first spine switch 202 can update a corresponding bit in the LLSV 222 to indicate failure of the fabric link. Similarly, when a control plane detects that the failed fabric link is restored, the first spine switch 202 can update the corresponding bit in the LLSV 222 to indicate restoration of the fabric link. The first spine switch 202 can utilize the LLSV 222 to generate and/or update the first RFRT 232 and the second RFRT 234. In more embodiments, the first RFRT 232 and the second RFRT 234 can also store timestamps associated with the updates to the operational statuses of the fabric links.

In additional embodiments, the first leaf switch 212 may store an uplink RFRT 242 associated with one or more uplink ports and corresponding uplink fabric links of the first leaf switch 212. The uplink RFRT 242 can store the operational statuses of the uplink fabric links of the first leaf switch 212. The uplink RFRT 242 may also store the timestamps associated with the updates to the operational statuses of the uplink fabric links. In some embodiments, as shown in Step 3 of FIG. 2, the first spine switch 202 can generate and transmit the FRP message to the first leaf switch 212. Upon receiving the FRP message, the first leaf switch 212 may identify an uplink fabric link associated with the FRP message. The first leaf switch 212 can identify and update a port link entry associated with the uplink fabric link in the uplink RFRT 242. The first leaf switch 212 can also update a timestamp associated with the uplink fabric link to indicate latest time of update of the operational status of the uplink fabric link. In certain embodiments, for example, the timestamp may be indicated by the FRP message. In more embodiments, for example, the first leaf switch 212 can determine the timestamp as the time of reception of the FRP message. In some more embodiments, the timestamp can be indicative of the time when the operational status of the fabric link changes.

Although a specific embodiment for the network 200 for carrying out the various steps, processes, methods, and operations described herein is discussed with respect to FIG. 2, any of a variety of systems and/or processes may be utilized in accordance with embodiments of the disclosure.

For example, the first spine switch 202 can transmit different FRP messages for different VFEs in the first spine switch 202. The elements depicted in FIG. 2 may also be interchangeable with other elements of FIG. 1 and FIGS. 3-10 as required to realize a particularly desired embodiment.

Figure 3:
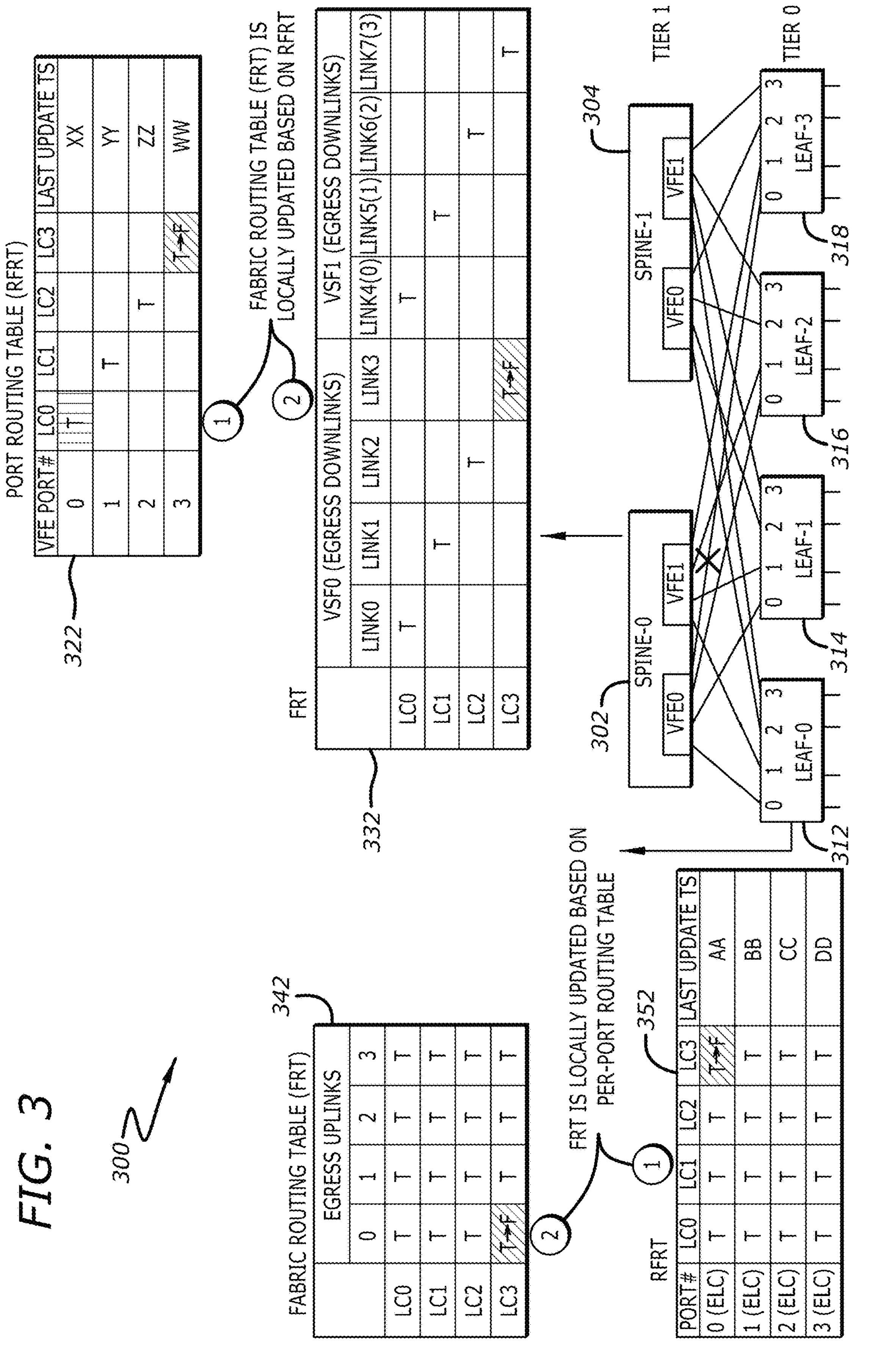
FIG. 3 is a conceptual illustration of a network for updating a plurality of Fabric Routing Tables (FRTs), in accordance with various embodiments of the disclosure.

Referring to FIG. 3, a conceptual illustration of a network 300 illustrating updating a plurality of FRTs, in accordance with various embodiments of the disclosure is shown. In many embodiments, the network 300 may comprise a plurality of spine switches including but not limited to a first spine switch 302 and a second spine switch 304. The plurality of spine switches may be connected to a plurality of leaf switches including but not limited to a first leaf switch 312, a second leaf switch 314, a third leaf switch 316, and a fourth leaf switch 318. The first spine switch 302 may comprise a first VFE (VFE-0) and a second VFE (VFE-1). Similarly, the second spine switch 304 may comprise a first VFE (VFE-0) and a second VFE (VFE-1). Each of the first and second VFEs may comprise four system ports, for example.

In a number of embodiments, the first spine switch 302 may generate and store a first RFRT 322 and a first FRT 332. The first RFRT 322 may be associated with the first VFE (VFE-0) and the first FRT 332 can be associated with both: the first VFE (VFE-0) and the second VFE (VFE-1). The first spine switch 302 may detect a change in the operational status of a fabric link associated with the first VFE (VFE-0). In some embodiments, the first spine switch 302 can update the first RFRT 322 to indicate the change in the operational status of the fabric link. The first spine switch 302 can also update the first FRT 332 based on the update to the first RFRT 322. The first spine switch 302 may transmit to the first leaf switch 312, the FRP update message indicative of the change in the operational status of the fabric link. In certain embodiments, the first spine switch 302 can also share the first FRT 332 with the first leaf switch 312.

In various embodiments, the first leaf switch 312 may store a second RFRT 352 and a second FRT 342. The first leaf switch 312 can receive the FRP message and update the second RFRT 352 based on the FRP update message. The first leaf switch 312 may update the second FRT 342 based on the update to the second RFRT 352.

Although a specific embodiment for the network 300 for carrying out the various steps, processes, methods, and operations described herein is discussed with respect to FIG. 3, any of a variety of systems and/or processes may be utilized in accordance with embodiments of the disclosure. For example, the network devices can dynamically update the RFRT and the FRT based on the received FRP messages. The elements depicted in FIG. 3 may also be interchangeable with other elements of FIGS. 1-2 and FIGS. 4-10 as required to realize a particularly desired embodiment.

Figure 4:
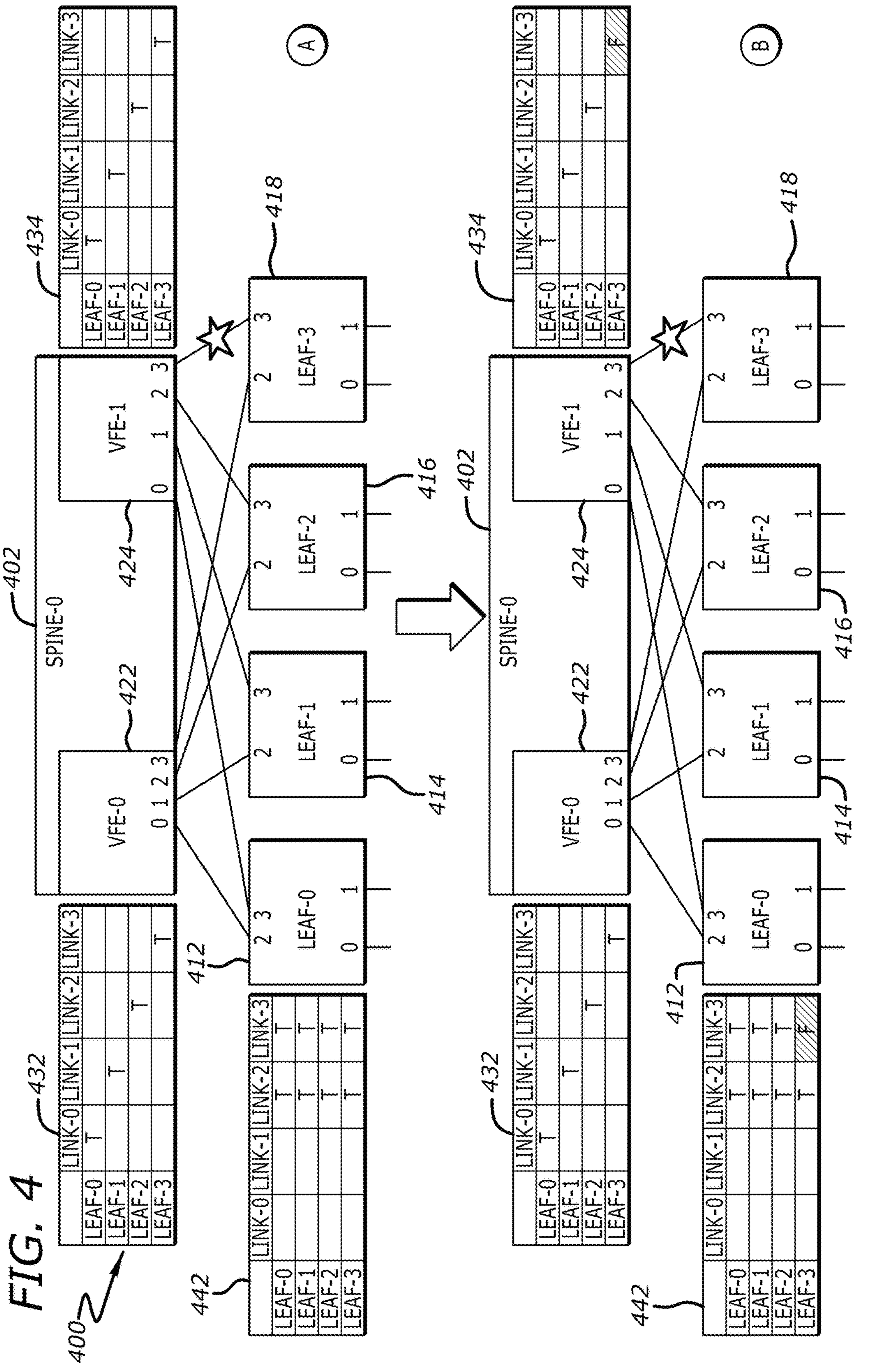
FIG. 4 is a conceptual illustration of a network illustrating a bandwidth-aware traffic management system, in accordance with various embodiments of the disclosure.

Referring to FIG. 4, a conceptual illustration of a network 400 illustrating a bandwidth-aware traffic management system, in accordance with various embodiments of the disclosure is shown. In many embodiments, the network 400 may comprise a plurality of spine switches including but not limited to a first spine switch 402. The first spine switch 402 can be connected to a plurality of leaf switches including but not limited to first leaf switch 412, a second leaf switch 414, a third leaf switch 416, and a fourth leaf switch 418. The first spine switch 402 may comprise a first VFE 422 and a second VFE 424. Each of the first VFE 422 and the second VFE 424 may comprise four system ports, for example.

In a number of embodiments, the first spine switch 402 can store a first FRT 432 associated with the first VFE 422 and a second FRT 434 associated with the second VFE 424. The first FRT 432 can store one or more device link entries associated with a first set of fabric links connected to the first VFE 422. Similarly, the second FRT 434 can store one or more device link entries associated with a second set of fabric links connected to the second VFE 424. Each of the first leaf switch 412, the second leaf switch 414, the third leaf switch 416, and the fourth leaf switch 418 may be connected to the first VFE 422 and the second VFE 424. That is, each of the first leaf switch 412, the second leaf switch 414, the third leaf switch 416, and the fourth leaf switch 418 may possess at least two routes to connect to the first spine switch 402: a first route through the first VFE 422 and a second route through the second VFE 424. The first spine switch 402 can configure and maintain different reachability planes for the connections between the first leaf switch 412, the second leaf switch 414, the third leaf switch 416, and the fourth leaf switch 418. In some embodiments, for example, for transmitting data from the first leaf switch 412 to the fourth leaf switch 418, the corresponding reachability planes may comprise local fabric links between the first leaf switch 412 and the first spine switch 402 as well as remote fabric links between the first spine switch 402 and the fourth leaf switch 418. In some embodiments, the first spine switch 402 can configure multiple VFEs including the first VFE 422 and the second VFE 424. The first spine switch 402 may also assign one or more system ports to each VFE including the first VFE 422 and the second VFE 424. In certain embodiments, for example, the first spine switch 402 may configure and maintain different reachability planes for different VFEs. In certain embodiments, for example, one or more reachability planes may be shared between one or more VFEs. In more embodiments, for example, the first spine switch may determine reachability and available bandwidth associated with each reachability plane.

In various embodiments, for example, the first spine switch 402 can configure two reachability planes between the first leaf switch 412 and the fourth leaf switch 418, viz. a first reachability plane through the first VFE 422 and a second reachability plane through the second VFE 424. The first spine switch 402 may monitor the operational statuses of the fabric links. In some embodiments, for example, the first spine switch 402 can continuously monitor the fabric links to instantaneously detect the change in the operational statuses of the fabric links. In certain embodiments, for example, the first spine switch 402 can monitor the fabric links dynamically and/or periodically. In more embodiments, for example, the change in the operational statuses of the fabric links can be determined by way of the control plane updates and/or by receiving interrupts from the IFG. In many more embodiments, the change in the operational statuses of the fabric links can comprise the fabric links being failed or restored. However, in still more embodiments, the change in the operational statuses of the fabric links can also include change in available bandwidth and/or congestion in the fabric links.

In additional embodiments, in an example, one of the four fabric links connected between the first spine switch 402 and the fourth leaf switch 418 may fail. The first spine switch 402 can detect the failure of the fabric link connecting to the fourth leaf switch 418. This may reduce the bandwidth available to transmit the data to the fourth leaf switch 418. Initially, the first leaf switch 412, the second leaf switch 414, and the third leaf switch 416 may be unaware of the reduction in the available bandwidth to transmit the data to the fourth leaf switch 418. The first spine switch 402 can generate and transmit the FRP update message to the first leaf switch 412, the second leaf switch 414, and the third leaf switch 416 to indicate the reduction in the bandwidth available to transmit the data to the fourth leaf switch 418. The first leaf switch 412 may generate and store a third FRT 442. Upon receiving the FRP update message, the first leaf switch 412 can identify the fabric link associated with the FRP message. The first leaf switch 412 can identify a device link entry in the third FRT 442 associated with the identified fabric link. The first leaf switch 412 may update the third FRT 442 to indicate the reduction in the bandwidth associated with the fourth leaf switch 418. Therefore, although the first leaf switch 412 can detect that the local fabric links, viz. the fabric links connecting to the first VFE 422 and the second VFE 424 are operational, the first leaf switch 412 may be informed about the failure of any of the remote fabric links, viz. the fabric links between the first spine switch 402 and the second leaf switch 414, the third leaf switch 416, and the fourth leaf switch 418. Therefore, the first leaf switch 412 can appropriately route the data based on information of the reduction in the bandwidth caused by the failure of the remote fabric links between the first spine switch 402 and the fourth leaf switch 418.

In further embodiments, for example, the bandwidth reduction can be caused by the fabric link failures associated with the second VFE 424 in the first spine switch 402 whereas the bandwidth associated with the first VFE 422 within the first spine switch 402 can be unaffected. Therefore, a second reachability plane associated with the second VFE 424 can face the bandwidth reduction whereas a first reachability plane associated with the first VFE 422 may be unaffected. As a result, the second FRT 434 associated with the second reachability plane may be updated to indicate the bandwidth reduction and a first FRT 432 associated with the first reachability plane may be unchanged. Thus, the first spine switch 402 may provide isolation between multiple VFEs and corresponding FRTs by utilizing separate reachability planes.

Although a specific embodiment for the network 400 for carrying out the various steps, processes, methods, and operations described herein is discussed with respect to FIG. 4, any of a variety of systems and/or processes may be utilized in accordance with embodiments of the disclosure. For example, the network 400 can provide bandwidth awareness to the network devices in the network 400. The elements depicted in FIG. 4 may also be interchangeable with other elements of FIGS. 1-3 and FIGS. 5-10 as required to realize a particularly desired embodiment.

Figure 5:
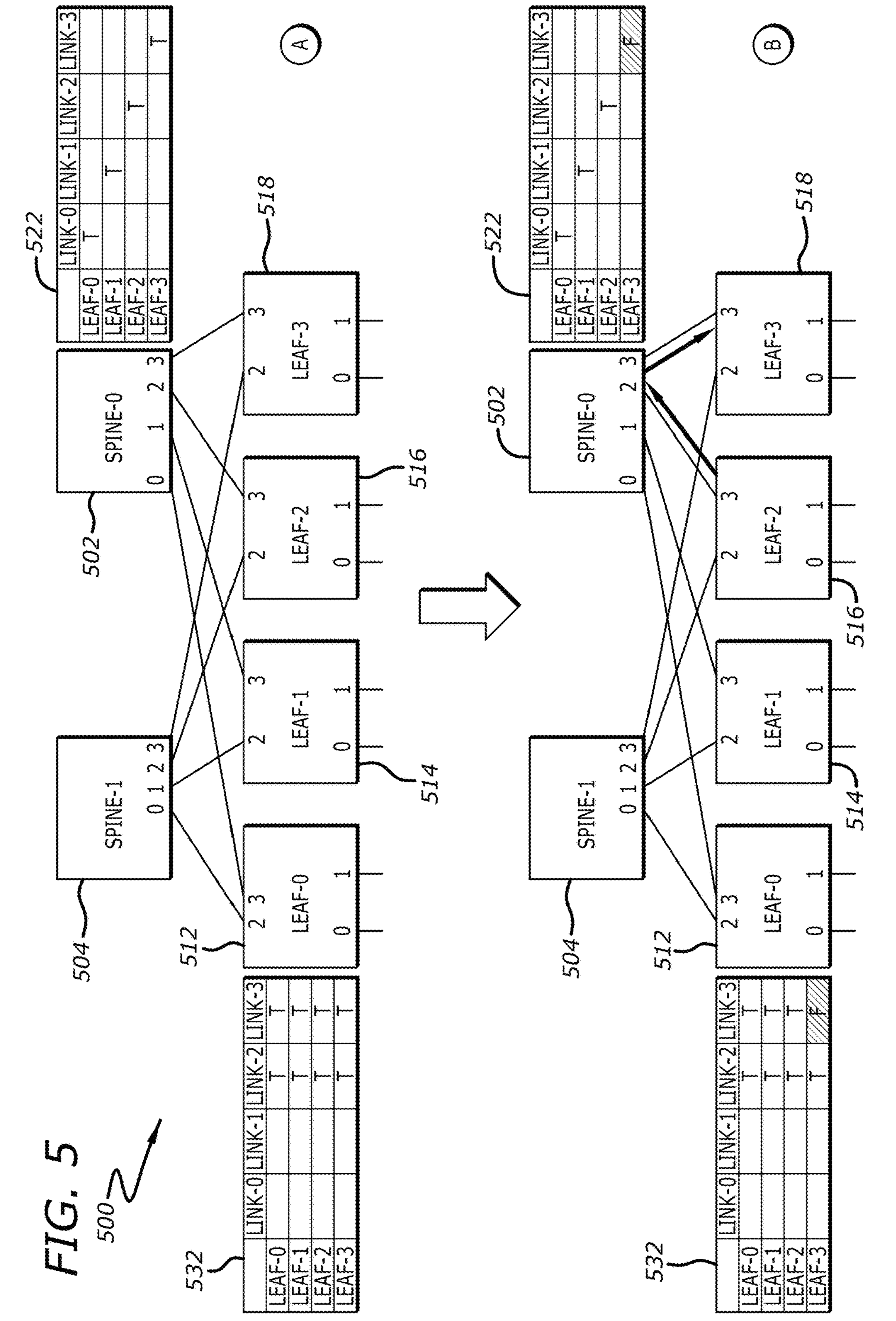
FIG. 5 is a conceptual illustration of a network illustrating a congestion-aware traffic management system, in accordance with various embodiments of the disclosure.

Referring to FIG. 5, a conceptual illustration of a network 500 illustrating a congestion-aware traffic management system, in accordance with various embodiments of the disclosure is shown. In many embodiments, the network 500 may comprise a plurality of spine switches including but not limited to a first spine switch 502 and a second spine switch 504. The plurality of spine switches may be connected to a plurality of leaf switches including but not limited to a first leaf switch 512, a second leaf switch 514, a third leaf switch 516, and a fourth leaf switch 518. In certain embodiments, for example, the first spine switch 502 can be associated with a first spine switch index (Spine-0) and the second spine switch 504 can be associated with a second spine switch index (Spine-1). Similarly, each leaf switch of the plurality of leaf switches may be associated with a leaf switch index. In more embodiments, for example, the first leaf switch 512 can be associated with a first leaf switch index (Leaf-0), the second leaf switch 514 can be associated with a second leaf switch index (Leaf-1), the third leaf switch 516 can be associated with a third leaf switch index (Leaf-2), and the fourth leaf switch 518 can be associated with a fourth leaf switch index (Leaf-3). Furthermore, each system port of the plurality of leaf switches and the plurality of spine switches may be associated with a port number. In some more embodiments, for example, the ingress ports of each of the plurality of leaf switches may be numbered Port-0 and Port-1 whereas the egress ports of each of the plurality of leaf switches can be numbered Port-2 and Port 3. Similarly, fabric facing ports of each of the plurality of spine switches may be numbered Port-0, Port-1, Port-2, and Port-3, for example. In numerous embodiments, the plurality of spine switches and the plurality of leaf switches may be connected in a mesh topology, thereby forming a leaf-spine fabric. In many more embodiments, for example, the leaf-spine fabric can be the DSF. In still further embodiments, for example, the leaf-spine fabric can support routing of different types of traffic, including but not limited to the packet spray traffic, flow spray traffic, or ECMP traffic etc.

In a number of embodiments, the first spine switch 502 can generate, store, and maintain a first Congestion-Aware FRT (CAFRT) 522. To generate the first CAFRT 522, the first spine switch 502 may utilize telemetry data received from the first leaf switch 512, the second leaf switch 514, the third leaf switch 516, and the fourth leaf switch 518. In some embodiments, for example, the telemetry data can be indicative of one or more of: amount of traffic, type of traffic, the fabric link associated with the traffic, or the reachability plane associated with the traffic etc. In certain embodiments, for example, the first spine switch 502 may also augment one or more of: the LLSV, RFRT, or FRT to indicate the congestion. In more embodiments, for example, the first spine switch 502 can update the first CAFRT 522 upon detecting the congestion and transmit the updated first CAFRT 522 to the other network devices in the network. In some more embodiments, for example, the first spine switch 502 can generate and transmit the FRP messages indicative of the detected congestion. In numerous embodiments, for example, the FRP messages may be augmented to indicate whether the reachability of the fabric link is affected by congestion or by failure. In further embodiments, for example, the FRP messages associated with the indication of congestion can be transmitted periodically, thereby facilitating periodic congestion updates to the first leaf switch 512 and the second leaf switch 514. In numerous embodiments, in operation, for example, if a high bandwidth flow spray traffic from the third leaf switch 516 to the fourth leaf switch 518 consumes 100% of the bandwidth of the fabric links associated with the first spine switch 502, the traffic from other leaf switches to the fourth leaf switch 518 and/or the third leaf switch 516 may be temporarily rerouted through the second spine switch 504 to avoid exacerbating the congestion, at least until the high bandwidth flow spray traffic terminates.

In various embodiments, the first leaf switch 512 and the second leaf switch 514 may receive the augmented FRP messages indicative of the congestion caused by the high bandwidth flow spray traffic from the third leaf switch 516 to the fourth leaf switch 518. The first leaf switch 512 may generate and store a second CAFRT 532. The first leaf switch 512 can update the second CAFRT 532 based on the received augmented FRP messages. In that, the first leaf switch 512 may identify the fabric link associated with the congestion indicated by the received FRP message. The first leaf switch 512 can identify a flow link entry in the second CAFRT 532 associated with the congested fabric link. The first leaf switch 512 may update the second CAFRT 532 based on the received augmented FRP message.

Although a specific embodiment for the network 500 for carrying out the various steps, processes, methods, and operations described herein is discussed with respect to FIG. 5, any of a variety of systems and/or processes may be utilized in accordance with embodiments of the disclosure. For example, the network 500 can provide congestion awareness to the network devices in the network 500. The elements depicted in FIG. 5 may also be interchangeable with other elements of FIGS. 1-4 and FIGS. 6-10 as required to realize a particularly desired embodiment.

Figure 6:
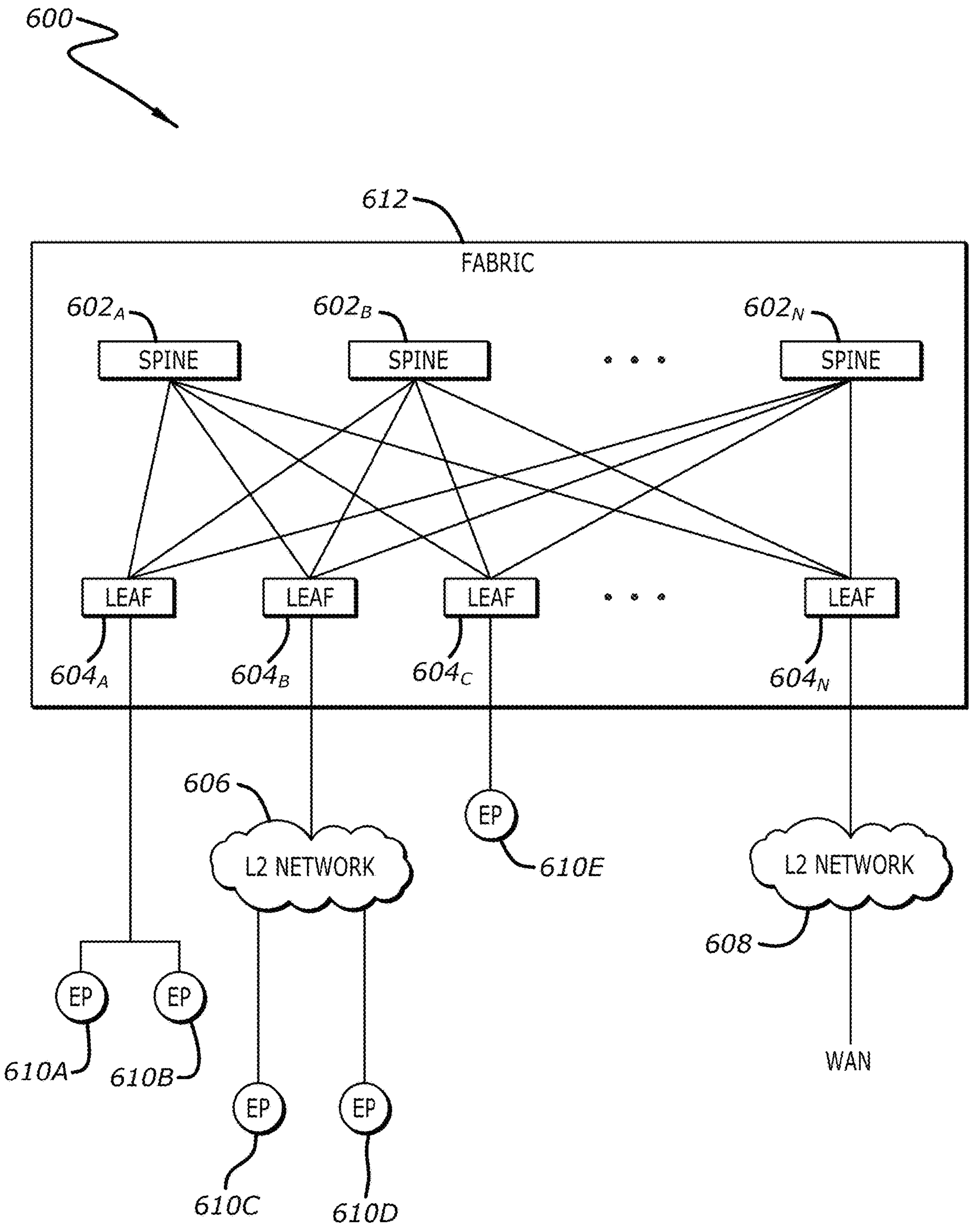
FIG. 6 is a conceptual illustration of an architecture for a network fabric, in accordance with various embodiments of the disclosure.

Referring now to FIG. 6, a schematic block diagram of an example architecture 600 for a network fabric 612, in accordance with various embodiments of the disclosure is shown. The network fabric 612 can include spine switches $\mathbf{602}_A$, $\mathbf{602}_B$, . . . , $\mathbf{602}_N$ (collectively "602") connected to leaf switches $\mathbf{604}_A$, $\mathbf{604}_B$, $\mathbf{604}_C$ . . . $\mathbf{604}_N$ (collectively "604") in the network fabric 612. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 602 can be L3 switches in the fabric 612. However, in some cases, the spine switches 602 can also, or otherwise, perform L2 functionalities. Further, the spine switches 602 can support various capabilities, such as, but not limited to, 40 or 10 Gbps Ethernet speeds. To this end, the spine switches 602 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 602 can be configured to host a proxy function that performs a lookup of the endpoint address identifier to locator mapping in a mapping database on behalf of leaf switches 604 that do not have such mapping. The proxy function can do this by parsing through the packet to the encapsulated tenant packet to get to the destination locator address of the tenant. The spine switches 602 can then perform a lookup of their local mapping database to determine the correct locator address of the packet and forward the packet to the locator address without changing certain fields in the header of the packet.

In various embodiments, when a packet is received at a spine switch $\mathbf{602}_i$ wherein subscript "i" indicates that this operation may occur at any spine switch $\mathbf{602}_A$ to $\mathbf{602}_N$, the spine switch $\mathbf{602}_i$ can first check if the destination locator address is a proxy address. If so, the spine switch $\mathbf{602}_i$ can perform the proxy function as previously mentioned. If not, the spine switch $\mathbf{602}_i$ can look up the locator in its forwarding table and forward the packet accordingly.

In a number of embodiments, one or more spine switches 602 can connect to one or more leaf switches 604 within the fabric 612. Leaf switches 604 can include access ports (or non-fabric ports) and fabric ports. Fabric ports can provide uplinks to the spine switches 602, while access ports can provide connectivity for devices, hosts, endpoints, VMs, or external networks to the fabric 612.

In more embodiments, leaf switches 604 can reside at the edge of the fabric 612, and can thus represent the physical network edge. In some cases, the leaf switches 604 can be top-of-rack ("ToR") switches configured according to a ToR architecture. In other cases, the leaf switches 604 can be aggregation switches in any particular topology, such as end-of-row (EoR) or middle-of-row (MoR) topologies. The leaf switches 604 can also represent aggregation switches, for example.

In additional embodiments, the leaf switches 604 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 604 can contain virtual switching functionalities, such as a virtual tunnel endpoint (VTEP) function. To this end, leaf switches 604 can connect the fabric 612 to an overlay network.

In further embodiments, network connectivity in the fabric 612 can flow through the leaf switches 604. Here, the leaf switches 604 can provide servers, resources, endpoints, external networks, or VMs access to the fabric 612, and can connect the leaf switches 604 to each other. In some cases, the leaf switches 604 can connect endpoint groups to the fabric 612 and/or any external networks. Each endpoint group can connect to the fabric 612 via one of the leaf switches 604, for example.

Endpoints 610 A-E (collectively "610", shown as "EP") can connect to the fabric 612 via leaf switches 604. For example, endpoints 610A and 610B can connect directly to leaf switch 604A, which can connect endpoints 610A and 610B to the fabric 612 and/or any other one of the leaf switches 604. Similarly, endpoint 610E can connect directly to leaf switch 604C, which can connect endpoint 610E to the fabric 612 and/or any other of the leaf switches 604. On the other hand, endpoints 610C and 610D can connect to leaf switch 604B via L2 network 606. Similarly, the wide area network (WAN) can connect to the leaf switches 604C or 604D via L3 network 608.

In certain embodiments, endpoints 610 can include any communication device, such as a computer, a server, a switch, a router, etc. In some cases, the endpoints 610 can include a server, hypervisor, or switch configured with a VTEP functionality which connects an overlay network, with the fabric 612. The overlay network can host physical devices, such as servers, applications, endpoint groups, virtual segments, virtual workloads, etc. In addition, the endpoints 610 can host virtual workload(s), clusters, and applications or services, which can connect with the fabric 612 or any other device or network, including an external network. For example, one or more endpoints 610 can host, or connect to, a cluster of load balancers or an endpoint group of various applications.

Although a specific embodiment for an architecture 600 is described above with respect to FIG. 6, any of a variety of systems and/or processes may be utilized in accordance with embodiments of the disclosure. For example, the architecture 600 could comprise any variety of endpoints, spine switches, and/or leaf switches. The elements depicted in FIG. 6 may also be interchangeable with other elements of FIGS. 1-5 and 7-10 as required to realize a particularly desired embodiment.

Figure 7:
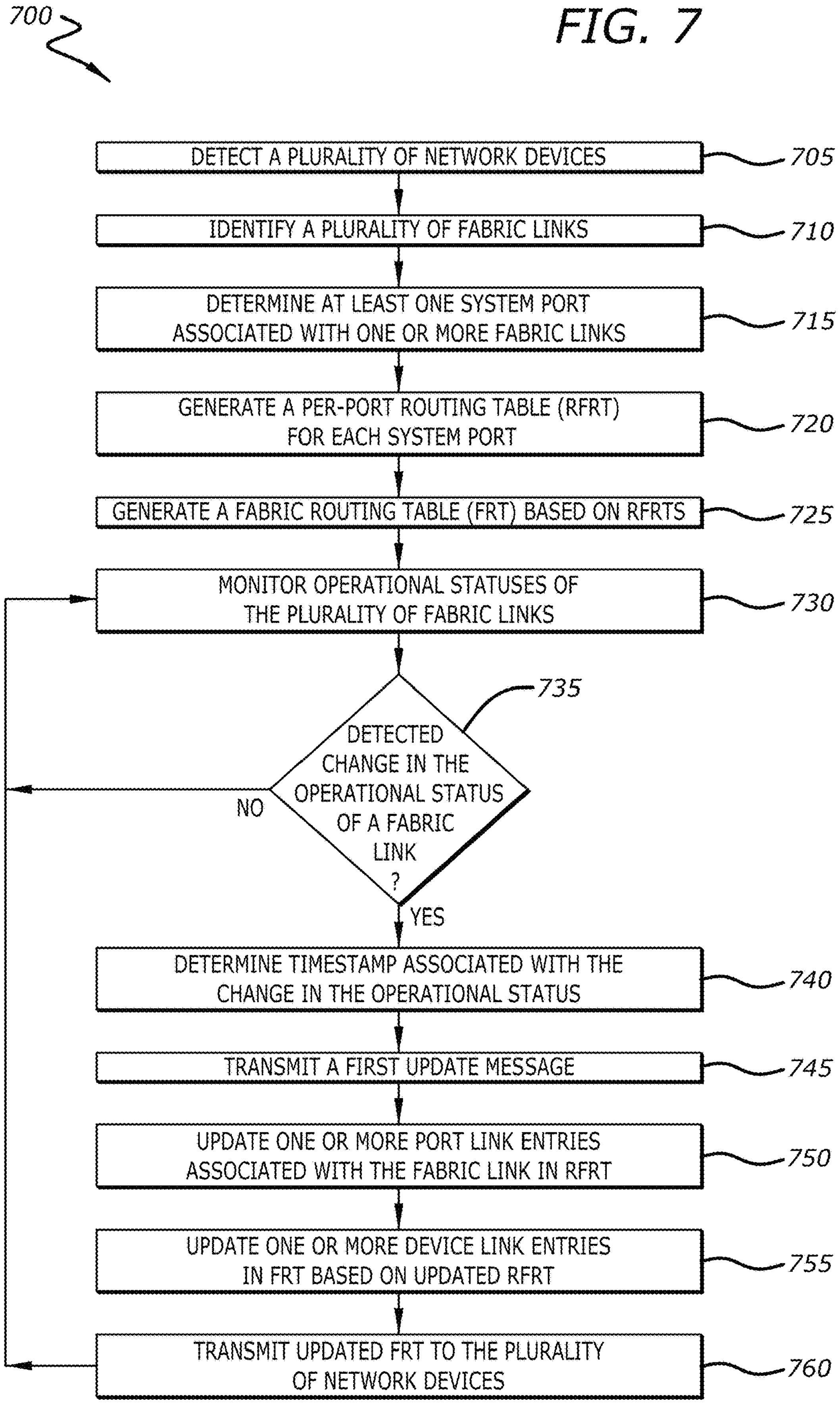
FIG. 7 is a flowchart depicting a process for updating an FRT, in accordance with various embodiments of the disclosure.

Referring now to FIG. 7, a flowchart depicting a process 700 of a updating the FRT, in accordance with various embodiments of the disclosure is shown. In many embodiments, the process 700 can detect the plurality of network devices in the network (block 705). In some embodiments, the process 700 can utilize one or more network discovery protocols such as but not limited to Link Layer Discovery Protocol (LLDP) or Cisco Discovery Protocol (CDP) etc. for detecting the network devices. In certain embodiments, for example, the process 700 can detect adjacent network devices as well as remote network devices in the network. In more embodiments, for example, the adjacent network devices may be the network devices directly connected and the remote network devices can be the network devices connected by way of one or more intermediate network devices. In some more embodiments, the process 700 may be implemented by one or more network devices, such as but not limited to the spine switches or the leaf switches in the network. In numerous embodiments, for example, the process 700 can be implemented by a network controller that may collect and aggregate discovery information received from one or more LLDP or CDP messages received from the plurality of network devices. In many further embodiments, for example, one or more network devices may independently perform discovery and share the discovery information with other network devices in the network and/or with the network controller.

In a number of embodiments, the process 700 can identify the plurality of fabric links (block 710). In some embodiments, the plurality of fabric links may be associated with the network device that implements the process 700. In certain embodiments, for example, the fabric links may be physical and/or logical connections utilized to communicate with the other network devices. In more embodiments, for example, a fabric link between a leaf switch and a spine switch in the network may be a physical connection and a fabric link between two leaf switches can be a logical connection.

In various embodiments, the process 700 may determine at least one system port associated with one or more fabric links (block 715). In some embodiments, for example, a system port of a leaf switch can be connected to one or more spine switches through one or more physical connections and the system port may be connected to the one or more other leaf switches through one or more logical connections. In certain embodiments, the process 700 can also configure one or more VFEs. In more embodiments, the process 700 can assign one or more system ports to the one or more VFEs.

In additional embodiments, the process 700 can generate the RFRT for each system port (block 720). In some embodiments, the RFRT can comprise one or more port link entries associated with one or more fabric links connected through the system port. In certain embodiments, for example, the RFRT can comprise information related to reachable routes, i.e., the fabric links, and reachable destinations, i.e., the network devices that can be communicated with through the fabric links. In more embodiments, for example, when a source network device transmits data to a destination network device through an egress port, an RFRT associated with the egress port may be utilized for identifying routes through which the data can be routed to the destination network device.

In further embodiments, the process 700 may generate the FRT based on RFRTs (block 725). In some embodiments, the FRT may comprise a plurality of device link entries associated with the plurality of fabric links connected to the network device. In certain embodiments, each device link entry can indicate the operational status of the corresponding fabric link. In more embodiments, for example, the device link entries may also indicate utilization parameters of the fabric link, such as but not limited to bandwidth utilization, latency, congestion, link health, or link performance, etc. for example. In some more embodiments, the device link entries may also comprise the timestamps indicative of the times of latest operational statuses of the fabric links. In numerous embodiments, for example, the timestamp can be indicative of a time of detecting the change in the operational status of the fabric link. In many further embodiments, for example, the timestamp may be indicative of a time of receiving an update message indicative of the change in the operational status of the fabric link. In still more embodiments, for example, the timestamp can be indicative of a time of change in the operational status of the fabric link.

In many more embodiments, the process 700 can monitor the operational statuses of the plurality of fabric links (block 730). In some embodiments, the process 700 may continually monitor the operational statuses of the plurality of fabric links to instantaneously detect the changes in the operational statuses of the plurality of fabric links. In certain embodiments, the process 700 may monitor the operational statuses of the plurality of fabric links dynamically and/or periodically. In more embodiments, the process 700 can receive updated operational statuses by way of interrupts from the IFG. In some more embodiments, the updated operational statuses can be detected by the control plane.

In many additional embodiments, the process 700 may check whether any change is detected in the operational status of a fabric link (block 735). In some embodiments, the change may be indicative of failure of the fabric link. In certain embodiments, the change can be indicative of restoration of a failed fabric link. In more embodiments, the change may be indicative of the reduction in bandwidth associated with the fabric link. In some more embodiments, the change may be indicative of the congestion in any fabric link. In still more embodiments, the change can be indicative of change in fabric link health or performance.

In many further embodiments, if the process 700 does not detect the change in the operational status of the fabric link, the process 700 can continue monitoring the fabric links (block 730). In some embodiments, for example, the process 700 can monitor periodically after expiration of a timer. In certain embodiments, the timer can be reset after expiration, to ensure periodic monitoring of the fabric links. In more embodiments, each network device can comprise the timer of same or different durations.

In many more embodiments, if the process 700 detects the change in the operational status of the fabric link, the process 700 can determine the timestamp associated with the change in the operational status (block 740). In numerous embodiments, for example, the timestamp can be indicative of the time of detecting the change in the operational status of the fabric link. In some embodiments, for example, the timestamp may be indicative of the time of receiving the update message indicative of the change in the operational status of the fabric link. In certain embodiments, for example, the timestamp can be indicative of the time of change in the operational status of the fabric link.

In many additional embodiments, the process 700 may transmit a first update message (block 745). In some embodiments, the first update message can be the FRP message. In certain embodiments, the process 700 can transmit the FRP message to one or more upstream devices. In more embodiments, for example, a VFE can generate and transmit FRP messages associated with a group of ports associated with the VFE.

In many further embodiments, the process 700 can update one or more port link entries associated with the fabric link in the RFRT (block 750). In some embodiments, updating the RFRT can comprise updating the LLSV. In certain embodiments, the LLSV can be a dynamic data structure for storing the operational statuses of the fabric links. In more embodiments, for example, each entry, i.e., each bit in the LLSV can be indicative of an operational status of a fabric link connected to the network device. In some more embodiments, the process 700 can dynamically update the LLSV, thereby dynamically updating the RFRT. In numerous embodiments, for example, upon receiving an interrupt from the IFG associated with failure of the fabric link, the process 700 can update the corresponding bit in the LLSV to indicate failure of the fabric link. Similarly, in many more embodiments, when the control plane detects that the failed fabric link is restored, the process 700 can update the corresponding bit in the LLSV to indicate restoration of the fabric link. In many further embodiments, the process 700 can utilize the LLSV to generate and update the RFRT.

In still many embodiments, the process 700 can update one or more device link entries in the FRT based on the updated RFRT (block 755). In some embodiments, for example, the FRT may be a transpose of the RFTs of the network device. In certain embodiments, the process 700 can identify the device link entry in the FRT corresponding to the port link entry in the RFRT and then update the identified device link entry based on the updates to the RFRT.

In still further embodiments, the process 700 may transmit the updated FRT to the plurality of network devices (block 760). In some embodiments, the process 700 can share the FRT by storing the FRT in a distributed database. In that, in more embodiments, for example, the network devices may push updates to the distributed database by way of the update messages. In certain embodiments, the process 700 may share the FRT by way of one or more network protocols. In more embodiments, for example, the network controller may receive the update messages, update the FRT, and broadcast the updated FRT to the network devices.

Although a specific embodiment for the process 700 for updating the FRT for carrying out the various steps, processes, methods, and operations described herein is discussed with respect to FIG. 7, any of a variety of systems and/or processes may be utilized in accordance with embodiments of the disclosure. For example, the process 700 may provide reachability awareness to the plurality of network devices by utilizing the FRT. The elements depicted in FIG. 7 may also be interchangeable with other elements of FIGS. 1-6 and FIGS. 8-10 as required to realize a particularly desired embodiment.

Figure 8:
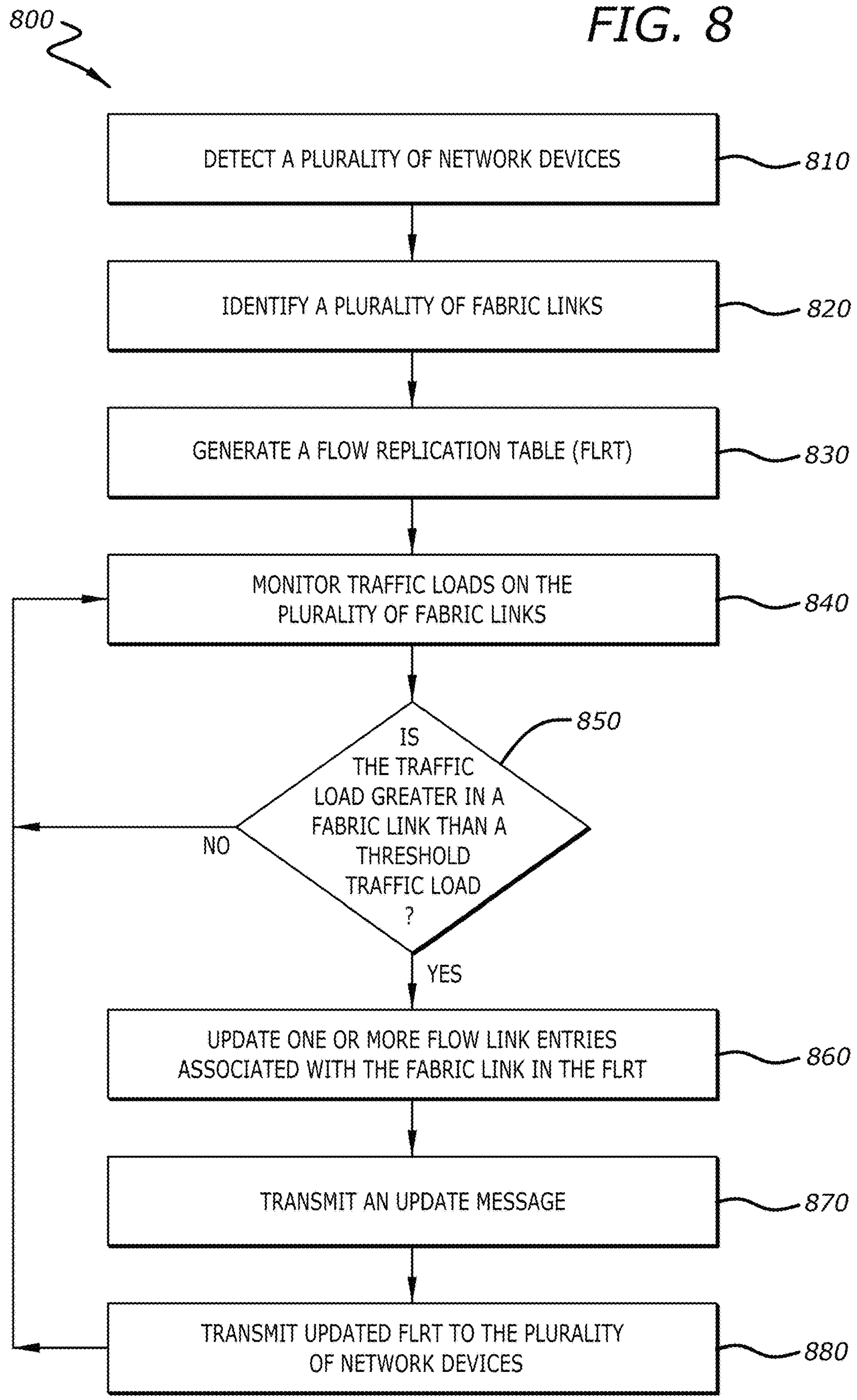
FIG. 8 is a flowchart depicting a process for providing congestion awareness, in accordance with various embodiments of the disclosure.

Referring now to FIG. 8, a flowchart depicting a process 800 of providing congestion awareness, in accordance with various embodiments of the disclosure is shown. In many embodiments, the process 800 can detect the plurality of network devices (block 810). In some embodiments, the process 800 can utilize one or more network discovery protocols such as but not limited to LLDP or CDP etc. for detecting the network devices. In certain embodiments, for example, the process 800 can detect adjacent network devices as well as remote network devices in the network. In more embodiments, for example, the adjacent network devices may be the network devices directly connected and the remote network devices can be the network devices connected by way of one or more intermediate network devices. In some more embodiments, the process 800 may be implemented by one or more network devices, such as but not limited to the spine switches or the leaf switches in the network. In numerous embodiments, for example, the process 800 can be implemented by a network controller that may collect and aggregate discovery information received from one or more LLDP or CDP messages received from the plurality of network devices. In many further embodiments, for example, one or more network devices may independently perform discovery and share the discovery information with other network devices in the network and/or with the network controller.

In a number of embodiments, the process 800 may identify a plurality of fabric links (block 820). In some embodiments, the plurality of fabric links may be associated with the network device that implements the process 800. In certain embodiments, for example, the fabric links may be physical and/or logical connections utilized to communicate with the other network devices. In more embodiments, for example, a fabric link between a leaf switch and a spine switch in the network may be a physical connection and a fabric link between two leaf switches can be a logical connection. In numerous embodiments, for example, the fabric links may include virtual links between one or more network devices, such as but not limited to the fabric links utilized for Virtual Local Area Network (VLAN), Virtual Private Network (VPN), Virtual extensible Local-Area Network (VXLAN) tunnels, or any other overlay networks. In further embodiments, for example, the one or more network devices may identify and report information of the fabric links to the network controller implementing the process 800. In many more embodiments, for example, the process 800 can utilize the information of the network devices and the fabric links therebetween to determine a topology of the network. In still many embodiments, for example, the process 800 can generate and store a network map indicative of the topology of the network. In many further embodiments, for example, the process 800 can periodically and/or dynamically update the network map to indicate the change in the operational statuses of the fabric links and/or the operational modes of the network devices. In some more embodiments, the process 800 can update the network map upon detecting one or more dynamic changes in the network topology, such as but not limited to addition and/or removal of devices, failure of fabric links, restoration of failed fabric links, creation of VxLAN tunnels, change in bandwidths of the fabric links, or congestion in the fabric links etc. for example.

In various embodiments, the process 800 can generate the CAFRT (block 830). In some embodiments, the process 800 may store the CAFRT in the memory of the network device that implements the process 800. In some embodiments, the CAFRT can be indicative of the congestion of the one or more fabric links associated with the network device. In certain embodiments, for example, the congestion may be caused due to high bandwidth flow spray traffic. In some more embodiments, for example, the CAFRT can be utilized by the network controller implementing the process 800 to determine congestion patterns and optimize one or more routing policies of the network. In numerous embodiments, the process 800 can utilize CAFRT to assign weights to the fabric links, thereby improving the routing decisions made by one or more routing protocols such as but not limited to Open Shortest Path First (OSPF) or Border Gateway Protocol (BGP) etc. In still more embodiments, the weights assigned to the fabric links may also be utilized for routing the flow spray traffic and/or the packet spray traffic over the fabric links.

In additional embodiments, the process 800 may monitor traffic loads on the plurality of fabric links (block 840). In some embodiments, the process 800 can monitor the traffic by receiving telemetry data associated with the plurality of network devices. In more embodiments, for example, the telemetry data can include but is not limited to bandwidth usage, packet loss, latency, link utilization, or error rates etc., for example. In certain embodiments, the process 800 can utilize one or more packet inspection techniques to determine the amount of traffic, type of traffic, or distribution of traffic etc. on the fabric links. In still more embodiments, for example, the process 800 may determine volumes associated with the identified types of traffic, such as but not limited to high volume video streaming traffic, low volume web browsing, low volume Internet of Things (IOT) traffic etc. for example. In numerous embodiments, the process 800 can also determine priorities associated with the identified types of traffic, such as but not limited to high priority file transfer traffic, or low priority background traffic etc. for example. In many more embodiments, the process 800 can detect occurrence of traffic patterns, such as but not limited to a normal traffic pattern, a sudden spike in the traffic, or bottlenecks, etc.

In further embodiments, the process 800 can determine whether the traffic load in the fabric link is greater than a threshold traffic load (block 850). In some embodiments, the threshold traffic load can be a dynamic threshold or a configurable threshold. In some more embodiments, the threshold traffic load can be in form of a percentage of maximum traffic supported by the fabric link. In numerous embodiments, the threshold traffic load may be different for different times of the day, for example, the process 800 may configure a higher threshold traffic load for peak hours and a lower threshold traffic load for non-peak hours. In many more embodiments, during periods of high traffic, the process 800 may dynamically lower the threshold traffic load to preemptively manage congestion. In still many embodiments, the threshold traffic load can be modified by a network administrator. In more embodiments, the process 800 may provide an alert to the network administrator when the traffic load in the fabric links exceeds the threshold traffic load. In many further embodiments, the process 800 can assign and store different threshold traffic loads for different fabric links or different types of fabric links. In certain embodiments, the process 800 may also determine a ratio of the packet spray traffic to the flow spray traffic. In more embodiments, the threshold traffic load may be different for the packet spray traffic and different for the flow spray traffic.

In many more embodiments, if the process 800 determines that the traffic load in the fabric link is not greater than the threshold traffic load, the process 800 can continue monitoring the traffic load in the fabric link (block 840). In many additional embodiments, if the process 800 determines that the traffic load in the fabric link is greater than the threshold traffic load, the process 800 can update one or more flow link entries associated with the fabric link in the CAFRT (block 860). In some embodiments, the CAFRT can include a plurality of flow link entries associated with the plurality of fabric links. In certain embodiments, the plurality of flow link entries may be indicative of one or more of: bandwidth or congestion associated with the corresponding plurality of fabric links. In more embodiments, the CAFRT can be updated and shared among the plurality of network devices. In many more embodiments, the process 800 can prioritize high priority traffic over low priority traffic upon detecting that the traffic load in the fabric link is greater than the threshold traffic load. In still many embodiments, the process 800 may utilize one or more ML models to predict the traffic patterns in the fabric links.

In many additional embodiments, the process 800 can transmit the update message to the other network devices in the network (block 870). In some embodiments, the update message may be the augmented FRP message. In certain embodiments, the augmented FRP message may be indicative of one or more of: traffic bandwidth, congestion, or ratio of the packet spray traffic to the flow spray traffic. In more embodiments, the update messages can be transmitted by the process 800 either periodically or dynamically. In many more embodiments, the network controller may receive the augmented FRP messages and optimize the routing policies based on congestion information indicated by the augmented FRP messages. In still many embodiments, the process 800 can trigger one or more changes in Quality of Service (QOS) associated with the traffic in the network based on the congestion information indicated by the augmented FRP messages.

In many further embodiments, the process 800 may transmit updated CAFRT to the plurality of network devices (block 880). In some embodiments, the updated CAFRT can be shared by way of the distributed database. In that, in more embodiments, the network devices may push updates to the distributed database by way of the update messages. In certain embodiments, the updated CAFRT may provide a comprehensive view of the congestion in the plurality of fabric links in the network. In more embodiments, the network controller may receive the update messages, update the CAFRT, and broadcast the updated CAFRT to the network devices.

Although a specific embodiment for the process 800 for providing congestion awareness for carrying out the various steps, processes, methods, and operations described herein is discussed with respect to FIG. 8, any of a variety of systems and/or processes may be utilized in accordance with embodiments of the disclosure. For example, the process 800 may provide congestion awareness to the plurality of network devices by utilizing the CAFRT. The elements depicted in FIG. 8 may also be interchangeable with other elements of FIGS. 1-7 and FIGS. 9-10 as required to realize a particularly desired embodiment.

Figure 9:
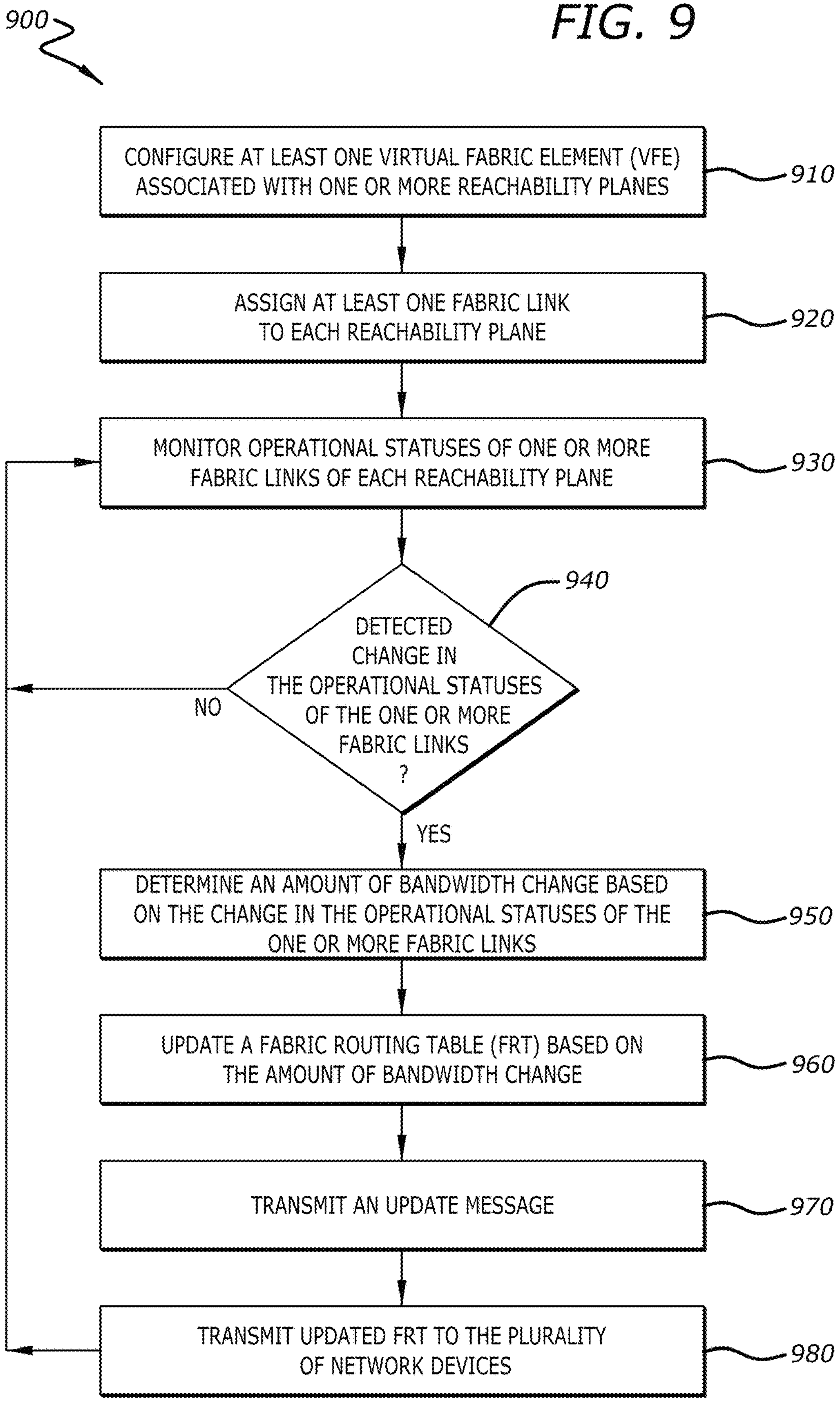
FIG. 9 is a flowchart depicting a process for providing bandwidth awareness, in accordance with various embodiments of the disclosure.

Referring now to FIG. 9, a flowchart depicting a process 900 of providing bandwidth awareness, in accordance with various embodiments of the disclosure is shown. In many embodiments, the process 900 can configure at least one VFE associated with one or more reachability planes (block 910). In some embodiments, for example, each VFE in the spine switch can function as a virtual spine switch. In certain embodiments, the process 900 can assign one or more system ports to each VFE. In more embodiments, one or more VFEs may function together and/or independently to provide routing functions within the leaf-spine fabric. In some more embodiments, each VFE may have a separate reachability plane and/or multiple VFEs may share one or more reachability planes. In many embodiments, for example, in multi-tenant architectures where multiple users can access a single network device, each tenant's traffic may be handled by a dedicated VFE with a dedicated reachability plane, thereby ensuring traffic isolation and security. In still many embodiments, for example, the VFEs on different spine switches may share a common reachability plane, thereby allowing for load balancing and redundancy across the leaf-spine fabric. In numerous embodiments, for example, the process 900 may facilitate the network administrator to configure the VFEs and assign the system ports to the configured VFEs.

In a number of embodiments, the process 900 may assign at least one fabric link to cach reachability plane (block 920). In some embodiments, the process 900 may determine reachability information for each reachability plane. In certain embodiments, the reachability information can indicate reachability as well as available bandwidth associated with the reachability plane. In more embodiments, for example, for a source leaf switch connected to the same spine switch through four local fabric links, the reachability plane can be associated with all fabric links connecting to the destination leaf switch, including: physical and logical connections between the source leaf switch and the destination leaf switch. In some more embodiments, that is, the reachability plane may be associated with the physical connections, i.e., the local fabric links between the source leaf switch and the spine switch as well as remote fabric links, i.e., the fabric links between the spine switch and the destination leaf switch. In numerous embodiments, the assignment of the fabric links to the reachability planes can be implemented by a Software-Defined Networking (SDN) controller, or the assignment may be changed or modified by the network administrator. In many more embodiments, the assignment of the fabric links to the reachability planes may be dynamically modified based on creation of VLANs, VxLAN tunnels, the overlay networks, or VPN etc. In still more embodiments, the assignment of the fabric links to the reachability planes can be dynamically changed upon detecting one or more dynamic changes to the topology of the network and/or the network map.

In numerous embodiments, the process 900 may monitor operational statuses of the one or more fabric links of each reachability plane (block 930). In some embodiments, the process 900 may continually monitor the operational statuses of the fabric links in the reachability planes to instantaneously detect the changes in the operational statuses of the plurality of fabric links. In certain embodiments, the process 900 may monitor the operational statuses of the fabric links in the reachability planes dynamically and/or periodically. In more embodiments, for example, monitoring the operational statuses of the fabric links of the reachability planes may include detecting anomalies in the traffic patterns by utilizing one or more ML models. In some more embodiments, for example, upon detecting the failure of the fabric links, the process 900 can additionally deploy redundant fabric links to the associated reachability plane or the process 900 may implement protocols such as but not limited to Spanning Tree Protocol (STP) or Link Aggregation Control Protocol (LACP) to automatically re-route the traffic to alternative routes etc. for example.

In various embodiments, the process 900 can check whether a change is detected in the operational statuses of the one or more fabric links (block 940). In some more embodiments, the process 900 can continually, dynamically, or periodically monitor the operational statuses of the fabric links. In certain embodiments, the process 900 may receive updates indicative of the changes from the IFG or the control plane.

In additional embodiments, if the process 900 determines that there are no changes in the operational statuses of the fabric links, the process 900 can continue monitoring the fabric links (block 930). In further embodiments, if the process 900 determines that there are changes in the operational statuses of the fabric links, the process 900 may determine the amount of bandwidth change based on the change in the operational statuses of the one or more fabric links (block 950). In some embodiments, if three of the four fabric links connected to the network device fail, the process 900 can determine that the reduction in bandwidth is 75%, i.e., the reduction in bandwidth may be measured in terms of percentage value of the maximum bandwidth associated with the fabric link. In some more embodiments, the process 900 can implement flow-based analysis techniques to monitor the traffic patterns and distribution of the traffic across fabric links, thereby facilitating identification of changes in the traffic distribution caused by the fabric link failures and estimation of the corresponding reduction in bandwidth.

In further embodiments, the process 900 may update the FRT based on the detected amount of bandwidth change (block 960). In some embodiments, the process 900 can determine one or more device link entries in the FRT that correspond to the bandwidth reduction. In certain embodiments, the process 900 may update the identified one or more device link entries. In more embodiments, the network controller may receive the update messages, update the FRT, and broadcast the updated FRT to the network devices.

In many more embodiments, the process 900 can generate and transmit an update message (block 970). In some embodiments, the update messages can be FRP messages. In certain embodiments, the process 900 may generate and transmit the update messages dynamically and/or periodically. In more embodiments, the network controller may receive the update messages and optimize the routing policies based on bandwidth reduction information indicated by the update messages.

In many additional embodiments, the process 900 may transmit the updated FRT to the plurality of network devices (block 980). In some embodiments, the updated FRT can be shared by way of the distributed database. In that, in more embodiments, the network devices may push updates to the distributed database by way of the update messages. In certain embodiments, the updated FRT may provide a comprehensive view of the available bandwidths in the plurality of fabric links in the network.

Although a specific embodiment for the process 900 for providing bandwidth awareness for carrying out the various steps, processes, methods, and operations described herein is discussed with respect to FIG. 9, any of a variety of systems and/or processes may be utilized in accordance with embodiments of the disclosure. For example, the process 900 may provide bandwidth awareness to the plurality of network devices by utilizing the FRT. The elements depicted in FIG. 9 may also be interchangeable with other elements of FIGS. 1-8 and FIG. 10 as required to realize a particularly desired embodiment.

Figure 10:
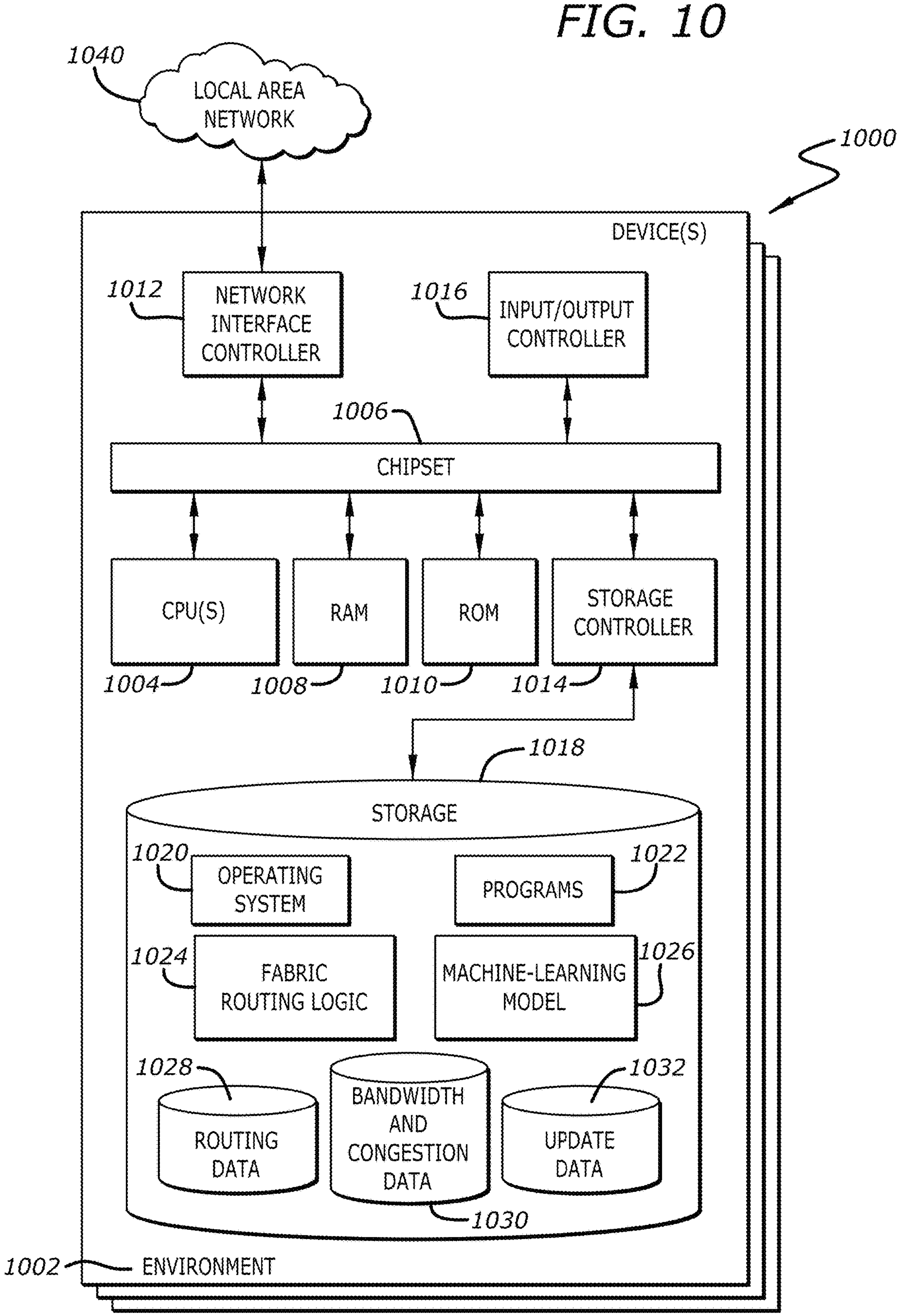
FIG. 10 is a conceptual block diagram of a device suitable for configuration with a fabric routing logic, in accordance with various embodiments of the disclosure.

Referring to FIG. 10, a conceptual block diagram of a device 1000 suitable for configuration with a fabric routing logic, in accordance with various embodiments of the disclosure is shown. The embodiment of the conceptual block diagram depicted in FIG. 10 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 10 can also illustrate an access point, a switch, or a router in accordance with various embodiments of the disclosure. The device 1000 may, in many non-limiting examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In a number of embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Additional embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for instance, store an operating system 1020, applications 1022, routing data 1028, bandwidth and congestion data 1030, and update data 1032 which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The routing data 1028 may store one or more of: the FRT, CAFRT, LLSV, or RFRT. The bandwidth and congestion data 1030 may store one or more parameters associated with the changes detected in the bandwidth and/or congestion in the fabric links. The update data 1032 can store the update messages and/or FRP messages generated by the device 1000 and/or received by the device 1000.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

In many more embodiments, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In many additional embodiments, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In certain embodiments, the device 1000 can also include computer-readable storage media having instructions stored thereupon for performing any of the other computer-implemented operations described herein.

In many further embodiments, the device 1000 may include a fabric routing logic 1024. The fabric routing logic 1024 can be configured to perform one or more of the various steps, processes, operations, and/or other methods that are described above. Often, the fabric routing logic 1024 can be a set of instructions stored within a non-volatile memory that, when executed by the processor(s)/controller (s) 1004 can carry out these steps, etc. In some embodiments, the fabric routing logic 1024 may be a client application that resides on a network-connected device, such as, but not limited to, a server, switch, personal or mobile computing device in a single or distributed arrangement. The fabric routing logic 1024 can generate, store, and modify one or more of: FRT, CAFRT, LLSV, or RFRT. The fabric routing logic 1024 may monitor the fabric links in the network and provide reachability awareness, bandwidth awareness, and congestion awareness to the network devices in the network. The fabric routing logic 1024 can route different types of data, such as but not limited to flow spray traffic, packet spray traffic, or ECMP traffic.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

Finally, in numerous additional embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026.

The ML model(s) 1026 can be configured to generate inferences to make predictions or draw conclusions from data. An inference can be considered the output of a process of applying a model to new data. This can occur by learning from at least the routing data 1028, the bandwidth and congestion data 1030, and the update data 1032 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although a specific embodiment for the device 1000 suitable for configuration with the fabric routing logic for carrying out the various steps, processes, methods, and operations described herein is discussed with respect to FIG. 10, any of a variety of systems and/or processes may be utilized in accordance with embodiments of the disclosure. For example, the device 1000 may be in a virtual environment such as a cloud-based network administration suite, or it may be distributed across a variety of network devices or switches. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor; and a memory communicatively coupled to the processor, wherein the memory comprises a fabric routing logic that is configured to:

detect a plurality of network devices;

identify a plurality of fabric links associated with the plurality of network devices;

determine one or more system ports associated with one or more fabric links of the plurality of fabric links;

wherein upon receiving an interrupt from an Interface Group (IFG) associated with a failure of a fabric link, the device updates a corresponding bit in a Live Link Status Vector (LLSV) to indicate failure of the fabric link;

update a corresponding bit in the LLSV to indicate restoration of the fabric link when a control plane detects that the failed fabric link is restored; and generate, for each system port of the one or more system ports, a Reverse Fabric Routing Table (RFRT), wherein the RFRT is associated with the one or more fabric links;

wherein upon a control plane detecting that the fabric link is restored, a first spine switch updates the corresponding bit in the LLSV to indicate restoration of the fabric link; and wherein the first spine switch utilizes the LLSV to generate and update the first RFRT and a second RFRT.

2. The device of claim 1, wherein generating the RFRT comprises determining one or more operational statuses of the one or more fabric links.

3. The device of claim 2, wherein the RFRT comprises one or more port link entries indicative of the one or more operational statuses of the one or more fabric links.

4. The device of claim 3, wherein the fabric routing logic is further configured to generate a Fabric Routing Table (FRT) based on one or more RFRTs associated with the one or more system ports.

5. The device of claim 4, wherein the FRT comprises a plurality of device link entries associated with the plurality of fabric links.

6. The device of claim 5, wherein the plurality of device link entries are indicative of a plurality of operational statuses of the plurality of fabric links.

7. The device of claim 6, wherein determining the one or more operational statuses of the one or more fabric links comprises detecting a change in an operational status of a first fabric link of the plurality of fabric links.

8. The device of claim 7, wherein the fabric routing logic is further configured to:

generate a first update message indicative of the change in the operational status of the first fabric link; and transmit the first update message to the plurality of network devices.

9. The device of claim 8, wherein determining the one or more operational statuses of the one or more fabric links comprises receiving a second update message indicative of a change in the operational status of a second fabric link.

10. The device of claim 9, wherein the fabric routing logic is further configured to:

identify the one or more port link entries associated with the first fabric link and the second fabric link; and modify the one or more port link entries to indicate the change in the operational status of the first fabric link and the second fabric link.

11. The device of claim 10, wherein the fabric routing logic is further configured to:

identify one or more device link entries associated with the one or more port link entries; and modify the one or more device link entries based on modification to the one or more port link entries.

12. The device of claim 11, wherein the one or more device link entries comprise one or more timestamps indicative of one or more times of modification of the one or more device link entries.

13. The device of claim 12, wherein the fabric routing logic is further configured to transmit the FRT to the plurality of network devices.

14. A device, comprising:

a processor; and a memory communicatively coupled to the processor, wherein the memory comprises a fabric routing logic that is configured to:

detect a plurality of network devices;

identify a plurality of fabric links associated with the plurality of network devices;

determine a plurality of operational statuses of the plurality of fabric links;

update a corresponding bit in a Live Link Status Vector (LLSV) to indicate failure of a fabric link upon receiving an interrupt from an Interface Group (IFG) associated with a failure of the fabric link;

update a corresponding bit in the LLSV to indicate restoration of the fabric link when a control plane detects that the failed fabric link is restored; and generate a fabric routing table comprising a plurality of link entries associated with the plurality of fabric links, wherein the plurality of link entries are indicative of the plurality of operational statuses;

detecting that the fabric link is restored using a control plane and wherein a first spine switch updates the corresponding bit in the LLSV to indicate restoration of the fabric link; and wherein the first spine switch utilizes the LLSV to generate and update a first RFRT and a second RFRT.

15. The device of claim 14, wherein the fabric routing logic is further configured to detect a change in an operational status of a fabric link of the plurality of fabric links.

16. The device of claim 15, wherein the fabric routing logic is further configured to:

generate an update message indicative of the change in the operational status of the fabric link; and transmit the update message to the plurality of network devices.

17. The device of claim 15, wherein the fabric routing logic is further configured to:

identify a link entry of the plurality of link entries associated with the fabric link; and modify the link entry to indicate the change in the operational status of the fabric link.

18. A method, comprising:

detecting a plurality of network devices;

identifying a plurality of fabric links associated with the plurality of network devices;

determining a plurality of operational statuses of the plurality of fabric links;

updating a corresponding bit in a Live Link Status Vector (LLSV) to indicate failure of a fabric link upon receiving an interrupt from an Interface Group (IFG) associated with a failure of the fabric link;

updating a corresponding bit in the LLSV to indicate restoration of the fabric link when a control plane detects that the failed fabric link is restored; and generating a fabric routing table comprising a plurality of link entries associated with the plurality of fabric links, wherein the plurality of link entries are indicative of the plurality of operational statuses;

detecting that the fabric link is restored using a control plane and utilizing a first spine switch to update the corresponding bit in the LLSV to indicate restoration of the fabric link; and wherein the first spine switch utilizes the LLSV to generate and update a first RFRT and a second RFRT.

19. The method of claim 18, wherein the method further comprises detecting a change in an operational status of a fabric link of the plurality of fabric links.

20. The method of claim 19, wherein the method further comprises:

identifying a link entry of the plurality of link entries associated with the fabric link; and modifying the link entry for indicating the change in the operational status of the fabric link.

* * * * *